(12) United States Patent
Karaoguz et al.

(10) Patent No.: US 8,908,699 B2
(45) Date of Patent: *Dec. 9, 2014

(54) PROVIDING AUTOMATIC FORMAT CONVERSION VIA AN ACCESS GATEWAY IN A HOME

(75) Inventors: Jeyhan Karaoguz, Irvine, CA (US);
Marc Abrams, Aliso Viejo, CA (US);
Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 2043 days.

This patent is subject to a terminal disclaimer.

(21) Appl. No.: 11/093,323

(22) Filed: Mar. 30, 2005

(65) Prior Publication Data

US 2005/0232284 A1      Oct. 20, 2005

Related U.S. Application Data

(60) Provisional application No. 60/563,894, filed on Apr. 16, 2004.

(51) Int. Cl.
*H04L 12/66* (2006.01)
*H04N 21/41* (2011.01)
*H04L 29/08* (2006.01)

(52) U.S. Cl.
CPC ............ *H04L 12/66* (2013.01); *H04N 21/4126* (2013.01); *H04L 67/2823* (2013.01)
USPC .......................................... 370/401; 370/466

(58) Field of Classification Search
None
See application file for complete search history.

(56) References Cited

U.S. PATENT DOCUMENTS

| | | | |
|---|---|---|---|
| 6,493,875 B1 | 12/2002 | Eames et al. | |
| 7,177,944 B1 * | 2/2007 | Chen et al. | 709/237 |
| 7,257,122 B1 * | 8/2007 | Keturi | 370/401 |
| 7,394,761 B2 * | 7/2008 | Foster et al. | 370/227 |
| 7,519,042 B2 * | 4/2009 | Gorday et al. | 370/347 |
| 7,522,549 B2 | 4/2009 | Karaoguz et al. | |
| 7,620,427 B2 * | 11/2009 | Shanahan | 455/567 |
| 7,688,764 B2 * | 3/2010 | Dorenbosch et al. | 370/260 |
| 8,009,608 B2 | 8/2011 | Karaoguz et al. | |
| 8,520,662 B2 | 8/2013 | Karaoguz et al. | |
| 2002/0021465 A1 | 2/2002 | Moore, Jr. et al. | |
| 2002/0038459 A1 * | 3/2002 | Talmola et al. | 725/81 |

(Continued)

FOREIGN PATENT DOCUMENTS

DE   19831169 B1   1/2000
DE   10208094 B2   9/2003

*Primary Examiner* — Rhonda Murphy
(74) *Attorney, Agent, or Firm* — Brinks Gilson & Lione

(57) ABSTRACT

A system and method supporting the automatic conversion of multimedia information from a first format to a second format in a broadband access gateway and/or network-based server are disclosed. The broadband access gateway and/or network-based server may convert multimedia information that is in a format that an access device is not capable of processing. The gateway and/or server may automatically detect the format incompatibility, and may automatically convert or arrange for conversion of the multimedia information to a format that is compatible with the access device, based upon compatibility information associated with the access device. The conversion may be based upon a set of user-defined quality of service criteria, and may be subject to the control of digital rights management parameters associated with the requested multimedia information. The user of the access device may be prompted when the conversion is expected to impact the quality of the multimedia information being played, and the user may be offered options that permit the user to minimize the impact upon the user.

20 Claims, 9 Drawing Sheets

(56) References Cited

U.S. PATENT DOCUMENTS

| | | | |
|---|---|---|---|
| 2002/0191635 A1* | 12/2002 | Chow et al. | 370/463 |
| 2003/0051041 A1* | 3/2003 | Kalavade et al. | 709/229 |
| 2003/0112335 A1* | 6/2003 | Strandwitz et al. | 348/211.2 |
| 2004/0017788 A1* | 1/2004 | Shmueli et al. | 370/328 |
| 2005/0064860 A1* | 3/2005 | DeLine | 455/420 |
| 2005/0188076 A1* | 8/2005 | Rayburn et al. | 709/224 |
| 2005/0239445 A1 | 10/2005 | Karaoguz et al. | |
| 2005/0241004 A1* | 10/2005 | Pyhalammi | 726/29 |
| 2009/0285204 A1* | 11/2009 | Gallant et al. | 370/352 |

* cited by examiner

PROVIDING AUTOMATIC FORMAT CONVERSION VIA AN ACCESS GATEWAY IN A HOME

RELATED APPLICATIONS

The present application makes reference to, claims priority to, and claims benefit of U.S. Provisional Patent Application Ser. No. 60/563,894, entitled "Method And System For Handling And Backhauling Traffic From A Wired And/Or Wireless WAN, LAN, And/Or PAN Using A Broadband Access Gateway", filed Apr. 16, 2004, the complete subject matter of which is hereby incorporated herein by reference, in its entirety.

The present application makes reference to U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety.

The present application also makes reference to U.S. patent application Ser. No. 11/039,020, entitled "Method And System For Providing Registration, Authentication, And Access Via A Broadband Access Gateway", filed Jan. 18, 2005, the complete subject matter of which is hereby incorporated herein by reference, in its entirety.

The present application also makes reference to U.S. patent application Ser. No. 11/095,842, entitled "Registering Access Device Multimedia Content Via a Broadband Access Gateway", filed Mar. 30, 2005, the complete subject matter of which is hereby incorporated herein by reference, in its entirety.

The present application also makes reference to U.S. patent application Ser. No. 11/095,188, entitled "Location-Aware Application Based Quality of Service (QoS) Via A Broadband Access Gateway", filed Mar. 30, 2005, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One major common problem faced by cellular and landline service providers is market competition. In today's climate of competitive markets, cellular service providers have found that one way for them to grow market share and defend their businesses is to be proactive and form alliances, and to partner with landline service providers. In addition, cellular service providers seek to differentiate their service offerings, and to capture the largest portion of market revenue by meeting an ever increasing demand for access to a wide range of media forms such as MP3 encoded audio, still and video imaging, data, instant messaging, and email. In a similar manner, the landline service providers have found that to grow market share and ward off competition, they too must be proactive and form alliances, and to partner with cellular service providers. Support for broad economical access to these converging forms of communication is needed to enable unfettered market growth, and to support the development and use of new handheld devices needed to provide increasing levels of mobile multimedia communication functionality.

Although the formation of alliances and partnerships between cellular service providers and landline service providers may help to ward off competition, such alliances and partnerships are faced with other problems. For example, the erection of cellular infrastructure such as cellular towers may be an expensive venture since this may require acquisition of real estate, whether in the form of outright purchases or through leasing. Cellular infrastructure also requires the establishment of one or more expensive backbone links to handle core network traffic. Another cellular-related problem is that the cellular signals do not penetrate and propagate in buildings such as homes and offices very well. This is especially true with the frequencies that are typically utilized in the United States, which may vary between 800 MHz and 1900 MHz or 1.9 GHz.

The use of digital media is growing at an extremely rapid pace. Most consumers today have a variety of devices that gather, store, process, generate, communicate, play back, and/or display information electronically, in a digital form. Examples of such devices include digital still and video cameras, personal digital assistants (PDAs), laptop and desktop personal computer (PC) systems, video cassette recorders (VCRs), personal video recorders (PVRs), document and photo scanners, digital and high definition television sets, stereo audio equipment, and mobile multimedia handsets, to name only a few. Access to streaming (real-time) multimedia programming generally requires that the user be aware of the capabilities of the device being used for access, and may require that the user specifically access multimedia information content that has been prepared with the capabilities of the access device in mind.

Multimedia information may be encoded and transferred using a number of protocols and formats. The standards used for the encoding and storage of multimedia information have proliferated, and a consumer now has the daunting task of finding ways to enjoy multimedia content in formats for which they do not have compatible equipment. Encoding and transmission protocols are being promulgated by a variety of manufacturers of hardware and software products. Due to business strategies, competing manufacturers frequently do not support standards originated by others. This may place the consumer in the uncomfortable and frustrating position in which they are unable to exchange electronic imagery and audio with their entire collection of family and friends. Some software tools do exist that enable the conversion between multimedia formats, but the complexities of their use may act as an impediment to many consumers who may otherwise be able to navigate the use of digital multimedia equipment such as video cameras and audio devices.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method providing automatic format conversion of multimedia information, substantially as shown in and/or described in connection with at least one of the figures, as set forth more completely in the claims.

These and other advantages, aspects, and novel features of the present invention, as well as details of illustrated embodi-

DETAILED DESCRIPTION OF THE INVENTION

Aspects of the present invention relate to the seamless merging of wide area networks, from any kind of wired and/or wireless wide area networks, to pockets of wired and/or wireless local area networks and personal area networks, which may be located in homes or other environment such as an office or business. More specifically, aspects of the present invention relate to automatic management of the quality of service (QoS) provided a user accessing multimedia information content, depending upon the nature of the multimedia information, the access device used for media consumption, and the communications path used by the access device. The management of quality of service may be performed by a broadband access gateway that may permit broadband network access via, for example, a personal cellular microcell, a personal area network (PAN), a wired or wireless wide area network (WAN), wireless local area network (WLAN) or other type of network located within a premises such as, for example, a home, office, business, or the like. Services that may be available via such a broadband gateway connection include, for example, access to the public switched telephone network (PSTN); Internet protocol (IP) phone access; extended access to commercial cellular and PCS networks such as, for example, TDMA, CDMA, and GSM; and access to and/or control of a variety of multimedia access devices or networked resources capable of providing streams of images, still pictures, video, and audio; to name only a few. Examples of multimedia information include streaming video, broadcast video, voice, digital data, text, digitized audio, digitized still images, digitized video, and digitized music. The merging of these various types of networks may enable transparent communication of all types of media between access devices, which may be coupled in a wired or wireless fashion to one or more of these networks. In an embodiment of the present invention, access to services available through a wireless broadband gateway may be simplified, permitting their use by a wider group of users of access devices in, for example, homes, offices, and businesses.

Figure 1:
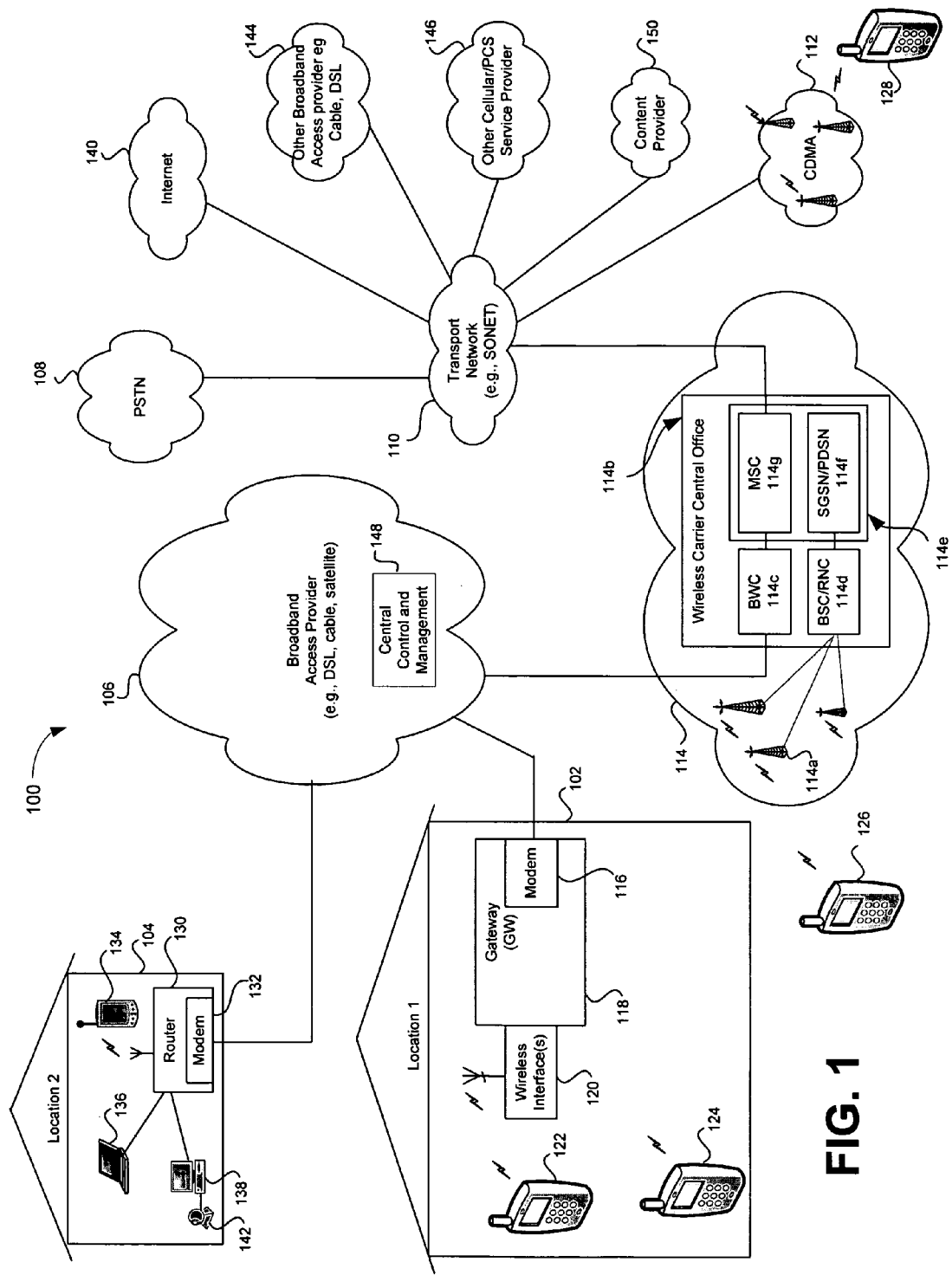
FIG. 1 is a block diagram illustrating an architecture of an exemplary communications system in which a representative embodiment of the present invention may be practiced.

FIG. 1 is a block diagram illustrating an architecture of an exemplary communications system in which a representative embodiment of the present invention may be practiced. Referring to FIG. 1, there is shown a first location 102, a second location 104, a broadband access provider (BAP) 106, public switched telephone network (PSTN) 108, a transport network 110, wireless networks including CDMA network 112 and GSM network 114, and access devices 126 and 128. The first location 102 comprises a gateway 118 having a modem 116, a wireless interface(s) block 120, and the access devices 122, 124. The access devices 122, 124, 126, 128 may comprise, for example, a mobile multimedia handset having a high level of functionality such as, for example, that of one or more of a digital video or still camera, a portable audio (MP3) player, a personal digital assistant, and a voice handset. The access devices 122, 124, 126, 128 may be capable of operating using, for example, a personal area network and/or wireless local area network compliant with, for example, Bluetooth, IEEE 802.11 a/b/g/n, and/or IEEE 802.15.3a ultra-wideband standards. The second location 104 comprises a router 130 having a modem 132, and a plurality of wireless access devices. The plurality of wireless access devices at the second location 104 may comprise a personal computer (PC) 138, a laptop 136 and a wireless personal digital assistant (PDA) 134. A peripheral such as a digital camera 142 may be coupled to the personal computer 138. Other peripherals such as printers, digital scanners, speakers, and the like, which are not shown, may also be coupled to the personal computer 138 and/or laptop 136. The wireless interface block 120 may comprise a plurality of interfaces such as a Bluetooth interface, an IEEE 802.15.3a ultra-wideband interface, and any combination of an IEEE 802.11 a, b, g and/or n interface.

FIG. 1 also comprises an "other broadband access provider" block 144, an "other cellular/PCS service provider" block 146, a central control and management block 148, and content provider 150. The "other broadband access provider block 144" may be, for example, a cable, DSL, or other type of broadband access provider. The central control and management block 148 may comprise suitable logic, circuitry and/or code that may be adapted to handle content delivery and security functions such as authentication, validation, key or certificate management, and authorization. The central control and management block 148 may also be adapted to handle provisioning and service management. In a representative embodiment of the present invention, the central control and management block 148 may establish communications links with, for example, the gateway 118, the broadband access provider 106, the other broadband access provider 144, the other cellular/PCS service provider 146, the CDMA network 112, and the GSM network 114 using actual or virtual connections.

The broadband access provider 106 may be, for example, a cable operator, telephone company, or satellite operator providing Internet access along with other communication services. In instances where BAP 106 is a telephone company, broadband service to locations 102, 104 may be provided via DSL or other broadband access technology. Accordingly, the modems 116, 132 may be DSL modems. In instances where BAP 106 is a cable operator, broadband service to locations 102, 104 may be provided via cable. Accordingly, the modems 116, 132 may be DOCSIS compliant or other type of cable modem. Given the rapid decrease in the cost of leased telephone lines over the past decade or more, the connection to the location 102, 104 may also be T1 or T3 connections. For example, a switch located at a central office (CO) (not shown) may be utilized to couple a T1 or T3 connection between the second location 104 and the PSTN 108.

The gateway 118 may comprise an integrated DSL modem, cable modem or other high-speed modem that may be required for handling a connection such as a T1 or T3 connection. Alternatively, the gateway 118 may be coupled to an external DSL modem, cable modem or other high-speed modem that may be capable of handling connections such as a T1 or a T3 connection. The gateway 118 may be adapted so that it has access to protocol stack information that may be related to the GSM and/or CDMA networks 114, 112, respectively. The gateway 118 may also be adapted to provide protocol support for communication with "other cellular/PCS service provider" block 146.

Each of the CDMA and GSM networks 112, 114 may comprise a plurality of cell sites (a/k/a cellular towers) that are located in geographical cells within each of the networks. Within the GSM network 114, each of the cell sites such as, for example, cell site 114*a* may comprise a base transceiver station (BTS), and one or more base transceiver stations (BTSs) may be coupled to wireless carrier central office 114*b*. The wireless carrier central office 114*b* may comprise a base station controller/radio network controller (BSC/RNC) such as BSC/RNC 114*d*. One or more base station controllers/radio network controllers (BSCs/RNCs) may be coupled to the core network 114*e*, that comprises a network edge switch called a mobile switching center (MSC), such as MSC 114*g*, and a serving GPRS support node (SGSN)/packet data serving node (PDSN) 114*f*, of the GSM network 114. The mobile switching center may be coupled to, for example, the PSTN 108 via the transport network 110. As an access device moves out of range of a first cell site to within range of a second cell site, the decrease signal power received from the first cell site and the increase in signal power received from the second cell site causes initiation of handoff of a call from the first cell site to the second cell site. In cases where there is no second cell site to handoff to, the call may be maintained by the first cell site power until it is attenuated to a threshold where it is no longer feasible to maintain the call. At the point where the power reaches or falls below this threshold, the call may drop and any related call resources may be relinquished. In a home and/or office environment, it may be desirable to have a second network to which the call may be handed off to.

As an illustration, a user may be on their way home and as the user approaches their home, the signal may fall below a minimum signal power threshold that is required to maintain a call. However, instead of dropping the call, the call may be handed off to, for example, a PAN or a wireless local area network (WLAN) that may be located within the user's home or an unlicensed wireless access system that may be located in the user's home. For example, with reference to FIG. 1, as access device 126 migrates from the vicinity of the serving cell site 114*a* in GSM network 114 towards the wireless interface 120 in the first location 102, the call may be handed off from the cell site 114*a* GSM network 114 to the wireless interface 120 coupled to the gateway (GW) 118 at the first location 102. Accordingly, instead of the call being dropped, the call has been seamlessly handed off and is now being handled by the gateway 118 via the wireless interface 120. The resulting wireless data may then be communicated to the GSM network 114 via the broadband connection to the BAP 106 which is connected to the broadband wireless local area network controller (BWC) 114*c*.

In this illustration, the user is handed off to their PAN, WLAN, or other network located within their home. However, the user could also have been handed off to another network system such as a neighbor's network. In any case, a gateway coupled to the wireless interface which is providing service to the user may communicate at least a portion of the data to, for example, the cable or DSL BAP 106, the GSM network 114, CDMA network 112, other broadband access service provider 144, other cellular/PCS service provider 146 and central control and management block 148. The user may be provided with a notification that indicates the presence of the PAN, WLAN, or other unlicensed network. For example, an icon representative of a personal area network may be displayed on the screen of the access device 126 once a soft or hard handoff is achieved from a serving cell site in GSM network 114 to the wireless interface 120 at the first location 102. A special tone or other audio alert may also be utilized to indicate that the call has switched to the wireless interface 120.

In instances where the gateway 118 detects a compatible access device that may be within the range of the wireless interface 120, the gateway 118 may immediately advertise its available services to the access device. In this regard, the gateway 118 may be adapted to transmit service advertisements to the access device in order to alert a user of the access device of the types of services that are being offered by the gateway 118. Signals containing icons representative of the services may be transmitted to and displayed on a screen of the access device and/or audio alerts may be utilized to notify the user of these services.

In another embodiment of the invention, quality of service (QoS) may also be advertised by the gateway 118. For example, when a user is being serviced by the wireless interface 120, the gateway 118 may advertise that stereo audio is available.

Access devices may be pre-registered so that when they are within the range of the wireless interface 120, the gateway 118 may automatically recognize them. For the pre-registration, an administrator of the gateway 118 at the first location 102 may register access devices that are allowed to access the gateway 118 when they are within the range of the wireless interface 120. Pre-registration may be done prior to the access device accessing the gateway 118. During pre-registration, an administrator or owner of the gateway 118 may enter registration or configuration information such as device IDs of access devices belonging to friends and/or family member's into a registration database associated with the gateway 118. As a result, these devices will be allowed to access at least a portion of the services offered by the gateway 118 whenever they attempt to access the gateway 118 by pressing a single button, for example. Opportunistic registration permits a user of an access device to register with the gateway 118 automatically with little or no effort on the part of the user. In this regard, registration information may be sent to the gateway 118 from an access device during an initial access and the gateway 118 may chose to accept or deny the registration. The registration information may be automatically or manually sent to the gateway 118.

In certain instances, an access device may not have been pre-registered to access the network. In this case, one button access may be provided. A single button such as a hard coded button or software-enabled button on an access device may be programmed to transmit identifying information from the access device to the gateway 118. The gateway 118 may utilize this transmitted identifying information to grant or deny access to its services. For example, one button may be programmed to contain access device identifying information related to accessing the services provided by gateway 118 at the first location 102. The gateway 118 may also be adapted to utilize digital certificates to authenticate access devices.

An interactive process may also be provided, whereby the gateway 118 may prompt or request particular information, for example a password from an access device requiring network access. If the particular information is received, then access to at least some of the services provided by the gateway 118 may be granted and if not, the access to at least some of the gateway's services may be denied.

In another embodiment of the invention, the one button access may be provided via software-enabled button (soft button) or hardware-enabled button (hard button). In this regard, the software button may be displayed on a screen of an access device.

A "walled garden" approach may be utilized to provide access to the services that may be offered by a particular gateway, for example, gateway 118. Under the walled garden approach, when an access device first registers or is identified, a basic set of services may be provided by the serving gateway 118 to the access device 124. The basic services offered may vary among each gateway. At least some of the basic services that are provided by a gateway such as gateway 118, may be offered without authenticating the access device 124. However, other services may only be offered if an access device such as access device 124 is properly authenticated. These services that are offered may be services that were advertised by the gateway 118.

In an aspect of the invention, access to additional services may be granted based on, for example, user identity, access device identity and or user input. The services offered to an access device by a gateway may be arranged in a hierarchical structure such as a tier. For example, in a first tier, a user may be prompted to enter membership information such as a member identification number. Upon authentication of the membership identification number, the first tier may provide restricted access with pop-up advertisements that may not be disabled. In a second tier, for example, a user may be prompted to enter a password. Upon authentication of the password, second tier information may provide restricted access to gateway services without pop-up advertisements. In a third tier, for example, entering billing information such as an account number or credit card or check card number may provide unlimited and/or unrestricted access to all the services offered by a gateway. A fourth tier may provide only operating instruction and information for guests.

An administrator of the gateway may establish the type of access provided by the walled garden. For example, if the first location 102 is a hotspot at a Café, the provider of the gateway may establish the service access levels or tiers that may be provided by the gateway 118.

When an access device is within the range of the gateway 118, wireless service is handed off from a serving cell site 114a in the GSM network 114 to the gateway 118. The access device may be authenticated by the gateway 118 and permitted to access at least some of the services offered by the gateway 118. Once the access device is authenticated, at least a portion of the information on the access device may be made available as a networked resource via the gateway 118. A user of the access device may chose whether information on the access device may be made available to the gateway and if so, that information which will be made available, and that information which will be unavailable to the gateway 118. In this regard, where information is made available, the gateway 118 may maintain a list of the resources that may be available on access devices that may be coupled to the gateway 118. For example, a list of contact information, calendar information, audio files, video file and/or data files stored on the access device may be sent to the gateway 118.

The resources that are available on the access device may also be advertised to other access devices that may be in communication with the gateway 118. Advertisement of the resources that may be available on an access device may be restricted to, for example, a list of particular devices, a particular type of devices or to a particular user. Accordingly, a user may have to be properly authenticated prior to certain information being made available to the user. Additionally, advertisement of the resources may cause certain icons representative of the resources to be displayed on other access devices. In a similar manner, icons representative of the resources that may be available on these other access devices may also be presented on the access device.

An access device may be provided with a welcoming screen that may allow a user of a device to sign up for either free or paid services. Once the signup is complete, subsequent access by the user may be authenticated by the gateway 118 utilizing the signup information. Whenever an access device registers with and/or is authenticated by the gateway 118, information on the access device may be updated and/or synchronized with information that may be on the gateway 118.

Devices within the location of the gateway 118 may be configured to register certain portions of their data content with the gateway 118 through a gateway registration process. Once data for these devices is registered to the gateway 118, the gateway may maintain a database, which keeps track of the data that is available, and its location. Accordingly, if the data previously stored in the database is no longer available, then information representative of the previously stored data may be removed from the database. Data from devices coupled to the gateway 118 such as on laptops, CD players, digital video disk (DVD) players, TIVO, personal video recorders (PVRs), personal digital assistants (PDAs) and other devices, may be registered with the gateway 118. This data may comprise audio, video, still pictures, and/or text.

At least a portion of the registered data may be made available to other network access devices via the gateway 118. In an aspect of the invention, the gateway 118 may be adapted to maintain a searchable list of data that may be available via the gateway. In this regard, the gateway may comprise a search engine that may be utilized to locate and distribute data that may be made available through the gateway 118. In another aspect of the invention, data may be made available to access devices via advertising by the gateway 118. Access devices may be configured to seek out particular data that may be of interest. Accordingly, an access device may be adapted to receive and process only those gateway advertisements may fit particular criteria. Those advertisements that may not fit the particular criteria may be discarded or ignored.

When an access device is within the range of the gateway 118, wireless service may be handed off from a serving cell site 114a in the GSM network 114 to the gateway 118. The access device may be authenticated by the gateway 118 and permitted to access at least some of the services offered by the gateway 118. Once the access device is authenticated, a user of the access device may have a desire to locate a particular video presentation. The user may access the search engine, which may have been advertised to the user's access device by the gateway 118. The search engine may appear on the display of the user's access device as an icon. The user may then activate a search by selecting the search engine icon, inputting a name of the video presentation and executing the search.

In another embodiment of the invention, the gateway may be adapted to classify information based on a given criterion. This classification may assist with locating information based on a particular criterion. In this regard, a user of the access device may be presented with a list of classifications and may select one, which may be of interest based on a particular criterion. This may narrow the focus of a search.

The gateway may also be utilized to facilitate seamless synchronization of data between devices that may be wired or wirelessly coupled to the gateway 118. For example, audio files located in a music folder on a PC coupled to the gateway 118 may be synchronized with a wireless media player coupled to a hot spot in an airport while a user of the wireless access media player waits to board a flight. In this regard, the gateway may determine what files need to be synchronized and control how the synchronization is accomplished. The same is true for files that may be downloaded from the PC to the wireless access media player, and for files that may be uploaded from the wireless access media player to the PC. Calendar and/or contact information may also be updated and/or synchronized with a mobile multimedia handset in a similar manner utilizing the gateway 118.

A location-aware service determines an approximate location of a network device and adapts delivery of a particular service application and/or content according to a quality of service criterion. The delivery of location-aware services may be controlled by the gateway 118. For example, a user of an access device may request playback of an audio clip via the gateway 118. After receiving the request for playback of the audio clip, the gateway 118 may determine that a channel between the gateway 118 and the user's access device may only be capable of maintaining a reduced playback rate. As a result, instead of sending 128 kbps encoded audio data, then the gateway may send 96 kbps data. Hence, in a case where the audio data was originally stored in 128 kbps sampled audio data, then the gateway 118 may transcode the 128 kbps sampled data to 96 kbps audio data.

In another illustrative embodiment of the invention, while the GSM network 114 is servicing the access device, lower compression rates may be utilized to provide service to the access device. However, when the access device roams within range of the wireless interface 120 and is being served by the gateway 118 through wireless interface 120, higher compression rates may be utilized. For example, audio data sampled at a data rate of 64 kbps may be utilized for playback on an MP3 enabled telephone while the phone is being serviced by a cell site 114a in the GSM network 114. However, once the MP3 enabled telephone is within the operating range of the wireless interface 120 and is being serviced by the gateway 118, the gateway 118 may automatically adapt to a higher data rate of, for example, 92 kbps or 128 kbps.

Automatic format conversion by the gateway 118 may include converting data from a first format to at least a second format suitable for delivery and/or display on an access device. This may permit data that would otherwise be incompatible with a first access device to be played on that first access device. For the location-aware services based on QoS, data was converted from a first format 128 kbps to a second format 96 kbps to achieve and/or maintain a particular QoS, but the data type remained the same. In this case, the audio format and/or its data type may be different. For example, if the audio format was MP3, then after the conversion, the format remained WAV and/or the sampling rate may have decreased from 128 kbps top 96 kbps.

In conventional wired caller ID systems, a name and/or directory number (DN) of a calling party may be transferred either in-band or out-of-band to a called party and may be displayed on the called party's caller ID display when a call is answered. In these conventional systems, the caller ID information is limited to a callers name, directory number (DN), general location and/or time of call. In wireless telephone systems, in order to save on bandwidth, only a caller's directory number is transferred and displayed to a calling party. However, if the calling party's directory number and name is stored in the called party's phone, then the stored name and stored directory number will be presented on a display of the called party's terminal. In this case, the stored directory number is compared with the transferred caller's directory number, and if a match occurs, then a name corresponding to the matching directory number is also displayed on the called party's terminal.

In accordance with an embodiment of the invention, the gateway 118 is adapted to determine the appropriate caller ID information that may be displayed in a called and/or calling party's caller ID. In this case, reverse caller ID information may be displayed on both a calling and a called parties terminal by the gateway 118.

If a called and/or calling device is a mobile multimedia handset and/or laptop, for example, contact or other personal information may be displayed the caller's and/or calling party's directory number. The level or amount of information that may be displayed may be varied. Certain sensitive information relating to either the called or calling party may be restricted from being displayed.

In current cellular communication systems, over the air (OTA) programming is utilized to program a cellular telephone during the provisioning process. In some instances, cellular providers have established websites that may be utilized or OTA programming. In this regard, a cellular subscriber may access the website and enter information such as the assigned directory number and the electronic serial number of the cellular telephone being programmed.

In accordance with a representative embodiment of the invention, an access device may be registered using over the air programming via the gateway 118. A user of an access device may send access device information to the gateway 118 using, for example, a default interface that may be presented to and displayed on a screen of the access device when the access device first enters the service area of the wireless interface 120. During registration, the capabilities of an access devices may be sent to the gateway 118 and may be shared with devices that may be coupled to the gateway 118.

Since the gateway acts as a registrar of information for all the access devices that may be wired or wirelessly coupled to it, the gateway may function as a personal digital assistant for any of these access devices. In an illustrative example, a first device, a first PC and a second PC are being serviced by the gateway 118. The first access device receives a call and the caller ID information shows the callers name, home directory number and home address. However, the first PC contains the business address for the caller and the second PC contains the monthly calendar information for the caller. Assume that the caller had a desire to setup a business meeting. In accordance with an aspect of the invention, the gateway 118 may be adapted to provide the business address of the caller to the first access device and also provide the caller's calendar to the first access device. In this manner, the network centrally provides all the information necessary for scheduling the meeting. In this example, the first PC may belong to the user of the first access device and the second PC may belong to the caller.

This concept may be extended to a look-up or 411 directory assistance on the Internet. The lookup may also be location dependent. In this regard, if a user is located in Hollywood and requests a hotel location, the gateway 118 may only cause the hotels that are located in Hollywood to be displayed to the user.

The gateway 118 may also be adapted to create profile information based on data usage. These created profiles may be utilized to create social networks for people having common interests. Accordingly, users may be permitted to post their interests and also select those people having similar interests based on the created profile. Based on the created profile information and the posted user interests, the gateway 118 may also generate a list of those people who have similar interest and also those users that may potentially have similar interests.

Given the capability to seamlessly operate an access device as one migrates from outside the home into the home, it is desirable to have a single device that may be adapted to control at least some of the devices that may be found within the home. In addition to its normal voice or data communication operating mode, an access device may be configured to operate as a universal remote that may be utilized to remotely control a plurality or other devices such as a TV, DVD, CD, Stereo, display monitor, or a combination thereof. Most access devices currently have an IR transmitter, which may be adapted to communicate with other IR receiver devices.

The access device may be used for wireless communication and for remotely controlling an electronic device with as a TV, CD/DVD recorder/player, or other device. The access device may also include at least one soft-button that may be enabled through the gateway 118 and may be utilized to control any other device that may be coupled to the gateway 118.

The gateway 118 is adapted to virtually aggregate data that may be visible from a plurality of access devices or other network devices. Although the gateway 118 may be adapted to store some service and content related information, the gateway 118 does not actually store copies of data that resides the access devices and/or other network devices that may be wired or wirelessly coupled to it. However, the gateway 118 may store, for example, metadata information that may be utilized to locate and access the information stored on the access devices and/or other network devices. The gateway is therefore adapted to function as a registrar of both service and content related information.

Whenever an access device registers with and/or is authenticated by the gateway 118, information may be collected from the access device and related metadata information may be updated and/or synchronized with information that may be currently stored on the gateway 118. Additionally, when a device is no longer being serviced by the gateway 118, associated information may be released from the gateway 118. In this regard, the virtual aggregations function performed by the gateway 118 guarantees that the most current information is accessible from the access devices.

Figure 2:
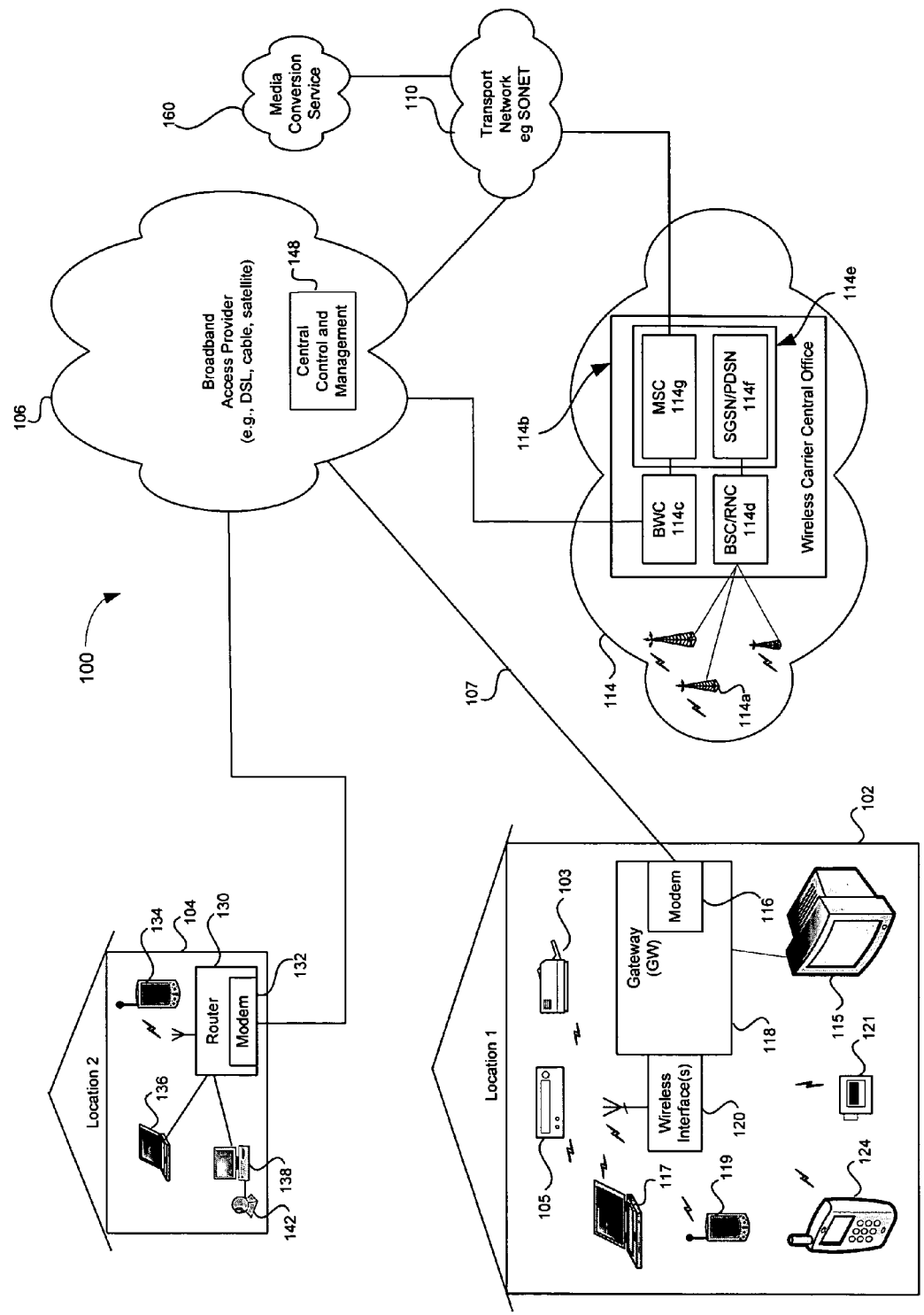
FIG. 2 shows a block diagram illustrating an exemplary communication system, in accordance with a representative embodiment of the present invention.

FIG. 2 shows a block diagram illustrating an exemplary communication system 100, in accordance with a representative embodiment of the present invention. The communication system 100 shown in FIG. 2 comprises a wireless interface 120, a gateway (GW) 118 with a modem 116, and an array of access devices such as, for example, a printer 103, a stereo receiver 105, a laptop 117, a wireless personal digital assistant (PDA) 119, and a digital video camera 121, at location 102. The communication system 100 of FIG. 2 also comprises an access device 124 that may correspond, for example, to the access devices 122, 124, 126 of FIG. 1. A second location 104 within communication system 100 comprises a router 130 with a modem 132, and a plurality of wireless access devices. The plurality of access devices at the second location 104 may, for example, comprise a personal computer (PC) 138, a laptop 136, and a wireless personal digital assistant (PDA) 134. A peripheral such as, for example, a digital camera 142 may be coupled to the personal computer 138. Other peripherals such as, for example, printers, digital scanners, speakers, and the like, that are not shown in FIG. 2, may also be coupled to the personal computer 138 and/or laptop 136. The wireless interface 120 may comprise a plurality of interfaces such as, for example, a Bluetooth interface, a cellular interface, and any combination of an IEEE 802.11 a, b, g, and/or n interface, and/or an IEEE 802.15.3a ultra-wideband interface. Although the following discussion refers frequently to the capabilities and actions of the gateway 118 and wireless interface 120, the same may be said of the router 130 with the modem 132 of FIGS. 1 and 2, for example, without departing from the spirit and scope of the present invention.

In accordance with a representative embodiment of the present invention, a wireless access device such as access device 124 may be mobile, and may move between the personal area network/wireless local area network coverage provided by wireless interface 120 at location 102, the wide area network coverage provided by, for example, GSM network 114, and the coverage provided by the router 130 and modem 132 at location 104. The location 102 may, for example, be the home of the user of the access device 124, the home of a friend or relative of the user of access device 124, or an office, business, etc., where the user of access device 124 may travel. The location 104 may, for example, be a second home of the user of access device 124, the home of a friend or relative, an office, or may have no personal or business relationship with the user of access device 124. In a representative embodiment of the present invention, the gateway 118 may comprise, for example, a set top box that may be coupled in a wireless or wired fashion to access devices such as, for example, a laptop computer or television, such as the laptop 117 and the television 115 of FIG. 2. Access to the communication bandwidth of a broadband network as previously described may be provided by the gateway 118 and the modem 116 to wired or wireless access devices in the vicinity of location 102, and via router 130 and modem 132 to wired or wireless access devices in the vicinity of location 104, as shown in FIG. 2. This architecture may provide extended access to wireless networks such as, for example, the GSM network 114, CDMA network 112, other cellular/PCS service provider 146, Internet 140 and public switched telephone network 108, of FIG. 1. The modem 116 is shown connected to a broadband access provider (BAP) 106 via a broadband connection 107. The broadband connection 107 may comprise, for example, a digital subscriber line (DSL) connection, a cable network connection, a satellite connection, a T1 or T3 network connection, or similar broadband communication link. The modem 116 is compatible with the broadband connection 107, and may be, for example, a DSL modem, a DOCSIS-compliant cable modem, a satellite service modem, or T1 or T3 compatible modem-type device. The broadband connection may provide access through BAP 106 to location 104, and via transport network 110 to, for example, GSM network 114.

In the example illustration of FIG. 2, a user of the access device 124 may or may not be engaged in communication with another system or subscriber accessible via the GSM network 114, or other wide area network of FIG. 1. Although the present example of FIG. 2 shows a GSM network 114, a representative embodiment of the present invention may be employed with respect to other wide area networks such as, for example, the CDMA network 112 and other cellular/PCS service provider 146, shown in FIG. 1.

When an access device such as, for example, the access device 124 of FIG. 2 moves into the coverage area of a personal area network of, for example, the wireless interface 120 and gateway 118, or the router 130, the access device 124 may be authenticated by the gateway 118 or router 130. The authentication may involve the sharing or exchange of identification and/or authentication information by the access device 124 with the gateway 118 or router 130. Details of an example of such an interaction are provided in U.S. patent application Ser. No. 11/039,020, entitled "Method And System For Providing Registration, Authentication, And Access Via A Broadband Access Gateway", filed Jan. 18, 2005, the complete subject matter of which is hereby incorporated herein by reference, in its entirety. Once the access device 124 has been authenticated to the gateway 118, the access device 124 may be permitted to exchange multimedia information and services available via the access devices in communication with the gateway 118, or via networks connected to the gateway 118. Information about the available multimedia information and services may be shared by and/or with the access device 124 via information exchanged by the access device 124 and the gateway 118 or router 130. Additional information about the advertising of such information may be found in U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety.

In a representative embodiment in accordance with the present invention, the user of an access device such as, for example, the access device 124, the laptop 117, and/or the wireless PDA 119 of FIG. 2 may desire to access or consume multimedia information via, for example, the gateway 118 or the GSM system 114. The term "consume" is used herein to represent operations such as, for example, the viewing of video or still pictures, the playing of audio or music, the reading text, etc. The quality of a viewing or listening experience, sometimes referred to by the term "quality of service" (QoS), is dependent upon a number of factors or criteria including, for example, the quality of the original audio or images, the method used to encode the source material for storage and transmission, and the bandwidth available in the pathway from the multimedia information source to the access device at which consumption occurs. Other criteria affecting quality of service during consumption of various forms of digitized media may include, for example, spatial resolution, color depth, frame rate, frequency of dropped frames, distortion in an audio signal, and acceptable delivery delay. For streaming video, the bandwidth needed to support such consumption depends upon a number of factors such as, for example, the number of pixels in each frame of video displayed, the number of bits per pixel, the number of frames displayed each second, the method of video encoding used, and the communication protocol used to transfer the multimedia information, to name only a few. For real-time audio playback, the bandwidth required may be a factor of, for example, the number of audio samples per second of playback, the number of bits per sample, the number of channels of audio being consumed (e.g., 1 for monaural, 2 for stereo, etc.), the type of coding used, and the communications protocols used to transport the multimedia information, in addition to other factors. Adjustments may be made to the factors affecting bit rate, to enable consumption of multimedia information over a variety of communication paths having different bandwidths. Additional details of this aspect of multimedia information access may be found in U.S. patent application Ser. No. 11/095,188 entitled "Location-Aware Application Based Quality of Service (QoS) Via A Broadband Access Gateway", filed Mar. 30, 2005, the complete subject matter of which is hereby incorporated herein by reference, in its entirety.

Multimedia information may be encoded for storage and transmission using any of a number of formats. Streaming video may be encoded using compressor/de-compressor algorithms (codecs) operating according to standards such as, for example, MPEG1, 2, or 4, Windows Media Video (WMV) format, Sorenson Video (by Sorenson Media), RealVideo (by RealNetworks, Inc.), International Telecommunication Union (ITU) H.261, ITU H.263, Portable Network Graphics (PNG) format, and ClearVideo (by EnXnet, Inc.), to name only a few. Still images may be processed using image compression algorithms according to standards such as, for example, the Joint Photographic Experts Group JPEG and JPEG 2000 specifications, the Joint Bi-Level Image Experts Group (JBIG) standard, the International Business Machines magnetic resonance (MR) image compression techniques, among others. In a similar fashion, a variety of standard exist for handling the efficient exchange of audio signals such as, for example MPEG-1 layer 3 (MP3), Advanced Audio Coding (AAC) (also known as ISO/IEC 13818-7), Ogg Vorbis, RealAudio (by RealNetworks, Inc.), and Windows Media Audio (WMA) (by Microsoft Corporation), to name just a few possible approaches. In general, electronic devices capable of, for example, video or audio playback support a selected subset of the video or audio compression/de-compression standards, and are unable to make use of multimedia information in formats for which they are not adapted.

Figure 3A:
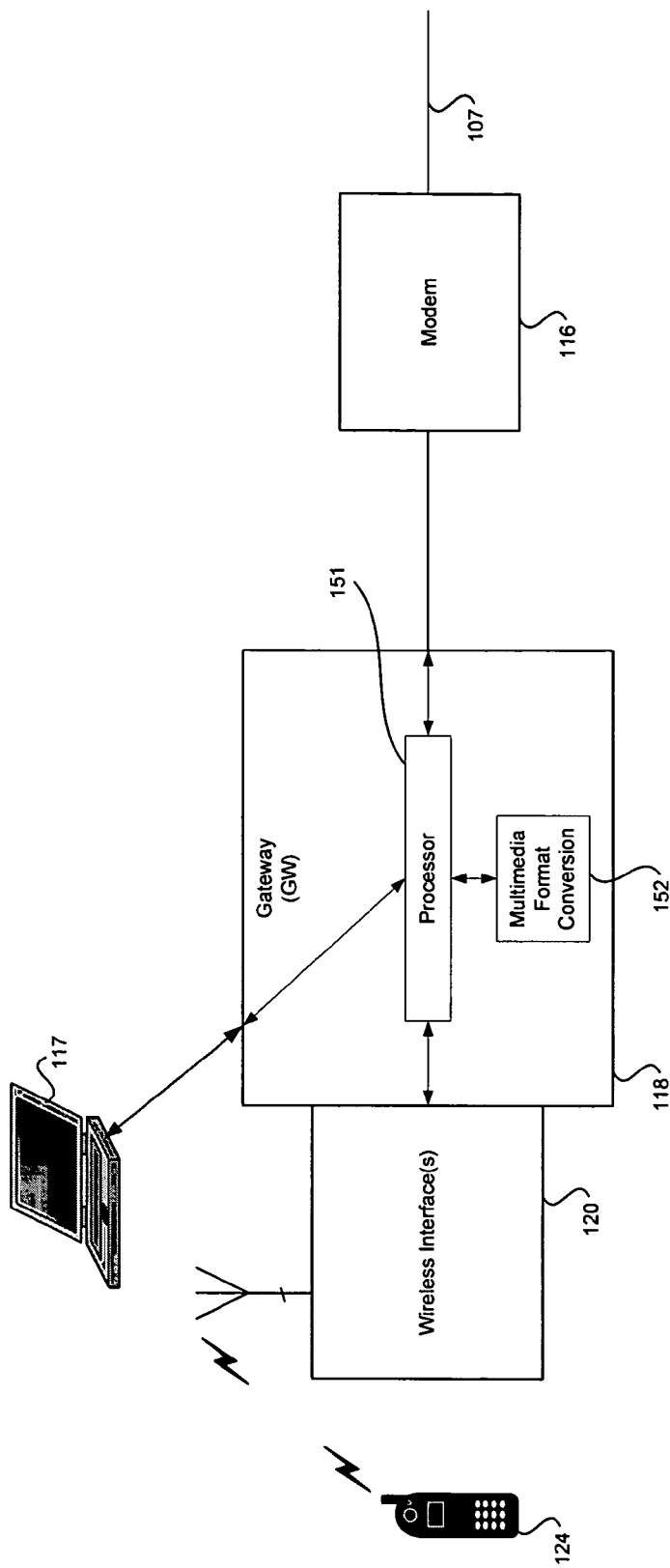
FIG. 3A is a block diagram of a portion of the communication system of FIG. 2, showing an exemplary broadband access gateway that may correspond, for example, to the gateway of FIGS. 1 and 2, in which the gateway supports automatic format conversion of multimedia information, in accordance with a representative embodiment of the present invention.

FIG. 3A is a block diagram of a portion of the communication system 100 of FIG. 2, showing an exemplary broadband access gateway 118 that may correspond, for example, to the gateway 118 of FIGS. 1 and 2, in which the gateway supports automatic format conversion of multimedia information, in accordance with a representative embodiment of the present invention. The broadband access gateway 118 of FIG. 3A is communicatively coupled to a wireless interface 120 that may correspond, for example, to the wireless interface 120 of FIGS. 1 and 2. The wireless interface 120 may permit the gateway 118 to communicate with wireless access devices such as, for example, the access device 124 that may be within the coverage area of the gateway 118. Such wireless access devices may include, for example, audio equipment such as a stereo receiver, speakers, printers, laptop computers, wireless personal digital assistants (PDAs), digital scanners, digital video cameras, mobile multimedia handsets, pointing devices, and the like. The gateway 118 of FIG. 3A is also communicatively coupled to a modem 116 supporting communication via the broadband connection 107. The modem 116 and the broadband connection 107 may correspond, for example, to the modem 116 and the broadband connection 107 of FIGS. 1 and 2. The gateway 118 of FIG. 3A comprises a processor 151 communicatively coupled to the wireless interface 120, the laptop 117, and the modem 116. The gateway 118 also comprises media format conversion functionality 152. The media conversion functionality 152 comprises the software and/or hardware capabilities for the conversion of multimedia information from one of the previously described formats to another.

In a representative embodiment of the present invention, a broadband access gateway such as, the gateway 118 of FIG. 3A, or the router 130 of FIG. 2, may receive from an access device such as, for example, the access device 124, the digital video camera 121, or the wireless PDA 119 of FIG. 3A, information identifying the multimedia format(s) that the access device is able to process. Such information may accompany or follow other information such as, for example, information that identifies the access device, that the access device may send to the gateway 118 when the access device enters the coverage area of the gateway 118. Information identifying the multimedia format(s) that the access device is able to process may also be sent periodically by the access device while the access device is being served by the gateway 118. In another representative embodiment of the present invention, the gateway 118 may determine the multimedia formats that may be processed by the access device using information identifying the access device. Such information may comprise, for example, a user or group identifier, an administrative identifier, a credit card number, an electronic serial number, and a type, model, or manufacturer of the access device.

A representative embodiment of the present invention may support the automatic conversion among a variety of still image, video, audio, and other forms of multimedia encoding formats such as, for example, the video, still image, and audio formats described above. To illustrate, in a representative embodiment of the present invention, a broadband access gateway such as, for example, the gateway 118 or the router 130 of FIG. 2 may detect a difference in the multimedia processing capabilities of an access device such as, for example, the access device 124 or wireless PDA 119 of FIG. 2, and the format of requested multimedia information. In one representative embodiment of the present invention, a broadband access gateway such as, for example, the gateway 118 of FIG. 3A may, upon detection of such a difference, automatically convert the requested multimedia information to one of the formats supported by the access device 124 or wireless PDA 119, for example. Multimedia information received from various sources such as, for example, via the broadband connection 107 may be automatically converted by the broadband access gateway 118 to be compatible with the access device with which the broadband access gateway 118 is in communication, or of which it is aware. The conversion of multimedia information may be performed according to user preferences that may be stored in an access device, in the broadband access gateway 118, and/or at the wireless carrier central office 114b, for example.

In another representative embodiment of the present invention, the conversion of multimedia information may be performed by server resources outside of the broadband access gateway 118 such as, for example, the media conversion service 160. For example, in some representative embodiments, the broadband access gateway 118 may not have sufficient memory and/or computing power to effectively convert multimedia information to the form(s) usable by the array of access devices with which the broadband access gateway 118 may share such information. In such a situation, streams of multimedia information may be directed to network-based server resources such as the media conversion service 160 for conversion, either at the time of media consumption, or automatically in advance of user demand for consumption. In some representative embodiments of the present invention, conversion may be performed as streams of incompatible multimedia information are en route to the broadband access gateway 118. Server resources used for conversion of multimedia information may be accessible via, for example, the broadband connection 107. Such server resources may perform conversion of multimedia information according to the preferences of a user of the multimedia information, and may charge a fee for such services. Information related to user preferences and billing for the conversion of multimedia information may reside, for example, on any of the access devices in communication with the broadband access gateway 118, at the broadband access gateway 118 itself, at the central control and management function 148, and/or at the wireless carrier central office 114b, for example.

Another representative embodiment of the present invention may, for example, support the conversion of still images among the still image formats described above. To illustrate, an image encoded using, for example, a JPEG format may be converted to a corresponding still image encoded using, for example, the portable network graphics (PNG) format. Such conversion of still images may involve, for example, reducing or increasing spatial resolution using decimation or interpolation, and may involve making adjustments in color depth, levels of gray scale, gamma correction, etc. By automatically performing format conversions, a broadband access gateway such as, for example, gateway 118, may enable a portable document format (PDF)-capable access device such as, for example, the access device 124 or the wireless PDA 119 of FIG. 2, to access facsimile documents by converting the group 3 (G3) facsimile format image information to PDF. In some representative embodiments of the present invention, the conversion may be performed by a network-based server accessible via a broadband connection such as, for example, the media conversion service 160 accessible via the broadband connection 107 of FIG. 2, for example. A representative embodiment in accordance with the present invention may be capable of converting proprietary formats of one access device to the proprietary or standards-based format of the access device used for multimedia consumption, or vice versa.

In a representative embodiment of the present invention, the bit rate of a coding of a multimedia resource may be changed to a higher or lower bit rate as a part of the conversion format in use. For example, streaming video encoded for consumption via a broadband network connection at a relatively higher bit rate may be converted to an encoding suitable for a communication path such as, for example, a cellular wide-area network, using a relatively lower bit rate.

In a representative embodiment of the present invention, conversion of multimedia information from a video format to a still image format, and from a still image format to a video format may be supported. Conversion from a video format to a still image format may involve, for example, the capture and re-coding of individual video frames selected from a video stream. The frames to be converted may be selected based upon, for example, an elapsed time of video playback, a number of video frames, or even motion within the video image. Image parameters such as, for example, aspect ratio, spatial resolution, color depth, number of gray scale levels, an amount of elapsed real time between captured images, may be used in the management of the conversion. One or more images in a still image format such as, for example, JPEG, may be converted into a video stream such as, for example, MPEG-2, when the access device used for viewing the images is capable of accepting streaming video, but is not capable of a particular format of still image display.

Figure 3B:
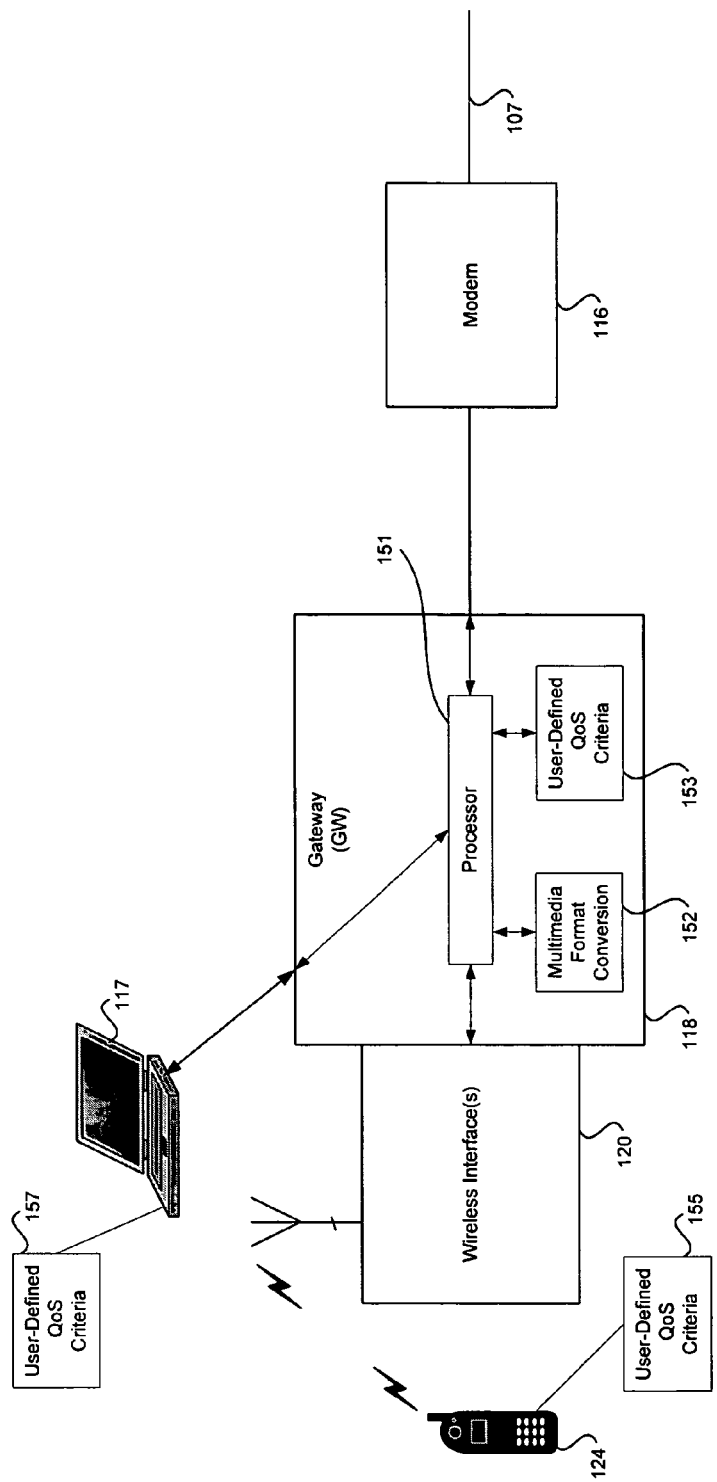
FIG. 3B is a block diagram of a portion of the communication system of FIG. 2, showing an exemplary broadband access gateway that may correspond, for example, to the gateway of FIGS. 1 and 2, in which the gateway supports automatic format conversion of multimedia information using quality of service information, in accordance with a representative embodiment of the present invention.

FIG. 3B is a block diagram of a portion of the communication system 100 of FIG. 2, showing an exemplary broadband access gateway 118 that may correspond, for example, to the gateway 118 of FIGS. 1 and 2, in which the gateway supports automatic format conversion of multimedia information using quality of service information, in accordance with a representative embodiment of the present invention. The broadband access gateway 118 of FIG. 3B is communicatively coupled to a wireless interface 120 that may correspond, for example, to the wireless interface 120 of FIGS. 1, 2, and 3A. The wireless interface 120 may permit the gateway 118 to communicate with wireless access devices such as, for example, the access device 124 that may be within the coverage area of the gateway 118. Such wireless access devices may include, for example, audio equipment such as a stereo receiver, speakers, printers, laptop computers, wireless personal digital assistants (PDAs), digital scanners, digital video cameras, mobile multimedia handsets, pointing devices, and the like. The gateway 118 of FIG. 3B is also communicatively coupled to a modem 116 supporting communication via the broadband connection 107. The modem 116 and the broadband connection 107 may correspond, respectively, to the modem 116 and the broadband connection 107 of FIGS. 1, 2, and 3A. The gateway 118 of FIG. 3B also comprises a processor 151 communicatively coupled to the wireless interface 120, the laptop 117, and the modem 116. In addition, the gateway 118 comprises media format conversion functionality 152. The media conversion functionality 152 comprises software and/or hardware capabilities for the conversion of multimedia information from one of the previously described formats to another. The communication system illustrated in FIG. 3B also comprises a set of user-defined quality of service (QoS) criteria 153, accessible to the processor 151 of the gateway 118. In addition, the illustration of FIG. 3B comprises user-defined quality of service criteria 155, 157 accessible, respectively, to the access device 124 and laptop 117, representing alternate locations in which the set of quality service criteria may reside. The quality of service criteria 155, 157 may be communicated to the gateway 118 upon entry into the coverage area of the gateway 118, or periodically while the access device or the laptop 117 is being served by the gateway 118.

In a representative embodiment of the present invention, conversion of multimedia information from one format to another may be based upon a set of quality of service (QoS) criteria such as, for example, the quality of service criteria 153, 155, 157 shown in FIG. 3B. When several options for format conversion are available, the quality of service (QoS) criteria 153, 155, 157 may be used in the selection of the format conversion. For instance, if the multimedia information to be accessed is available in MPEG-4 format, and the access device 124 is capable of processing Windows Media Video (WMV) format, the gateway 118 may adapt the MPEG-4 encoded multimedia information to WMV encoding, subject to the quality of service criteria that the user has defined. If the quality of service criteria 153, 155, 157 indicate, for example, that resolution is of greater importance to the user of the access device than, say, the frame rate, the format chosen for the multimedia information sent to the access device 12 may be adjusted, or parameters of a format conversion may be set in a manner to support higher-resolution images at a reduced frame rate, according to the available bandwidth of the communication path in use.

In one representative embodiment of the present invention, the gateway 118 may inform the user of the access device 124 when conversion of multimedia information is necessary to enable the user to access the requested multimedia information, and when the conversion is likely to impact the quality of the consumption of the multimedia information. For example, the user of the access device may not be notified of the conversion, if the conversion of the requested multimedia information can be accomplished within the quality of service criteria 153, 155, 157. In another representative embodiment in accordance with the present invention, the user may be unaware that a conversion of the requested multimedia information has been performed, if the gateway 118 determines that no detrimental effects of the conversion will be evident to the user. For instance, the user may be notified when conversion is needed to access the multimedia information, if it is determined that the converted multimedia information is unlikely to meet the quality of service criteria 153, 155, 157 of the user. In yet another representative embodiment of the present invention, a broadband access gateway in accordance with an embodiment of the present invention may inform the user of the incompatibility of the requested multimedia information and their access device, and of ability of the gateway to convert the requested multimedia information to a usable format, and may prompt the user to select from several possible conversions to various formats, showing or describing for each conversion the possible observable impairments. Other criteria impacting the quality of service may also be modified by a conversion of multimedia information. Examples include spatial resolution, color depth, number of levels of gray scale, frame rate, number of dropped frames, bits per audio sample, number of samples per second, and number of channels of audio, to name only a few. A user of an access device such as, for example, access device 124, the laptop 117, and the wireless PDA 119 may be notified regarding the quality of service impact of modification of these and other parameters, as well.

For example, a user wishing to view a streaming video clip that is not compatible with their access device may be notified when it is determined that a cost-of-network-usage criteria that they have defined may be violated. This may result, for example, when conversion of the streaming video clip to an access-device-compatible format requires greater bandwidth than that allowed under the user-defined cost-of-network-usage quality of service criteria. In a representative embodiment of the present invention, a broadband access gateway such as, for example, the gateway 118 or the router 130 of FIG. 2 may make the user of an access device such as, for example, the access device 124, the laptop 117, or the wireless PDA 119 aware of the need to convert multimedia information from the format of the source of the multimedia content, to a second format compatible with the access device 124 of the user. In other representative embodiments of the present invention, the functions related to the conversion of multimedia information may be performed by network-based servers.

Figure 3C:
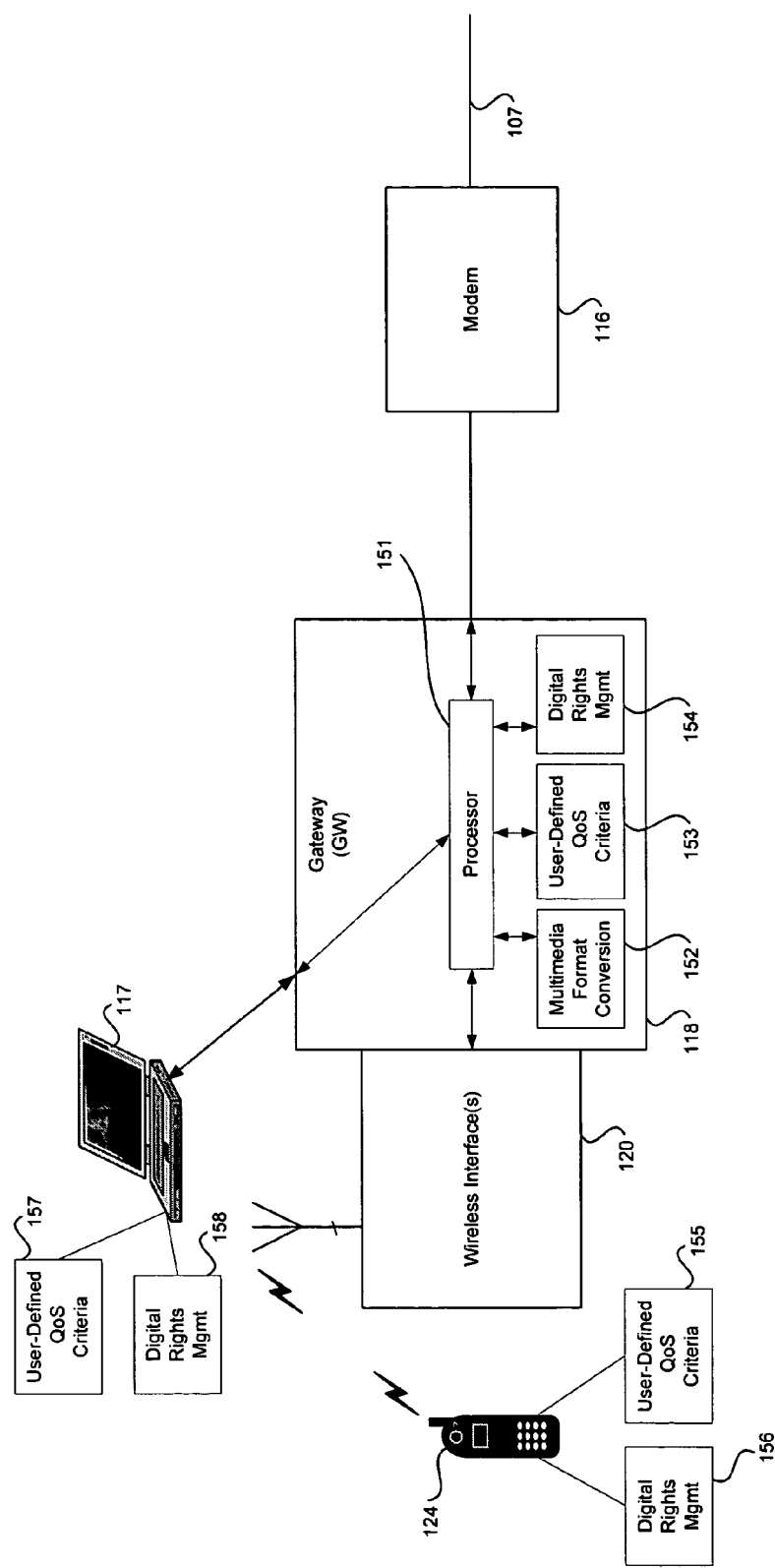
FIG. 3C is a block diagram of a portion of the communication system of FIG. 2, showing an exemplary broadband access gateway that may correspond, for example, to the gateway of FIGS. 1 and 2, in which the broadband access gateway support digital rights management based conversion of multimedia information, in accordance with a representative embodiment of the present invention.

FIG. 3C is a block diagram of a portion of the communication system 100 of FIG. 2, showing an exemplary broadband access gateway 118 that may correspond, for example, to the gateway 118 of FIGS. 1 and 2, in which the broadband access gateway support digital rights management based conversion of multimedia information, in accordance with a representative embodiment of the present invention. Digital rights management may employ a set of rules and/or guidelines that may permit a broadband access gateway such as, for example, the gateway 118 to convert user-requested multimedia information to an alternate version usable by an access device, while also protecting the authorship and ownership rights associated with the original version multimedia information. As shown in FIG. 3C, the broadband access gateway 118 is communicatively coupled to a wireless interface 120 that may correspond, for example, to the wireless interface 120 of FIGS. 1 and 2. The wireless interface 120 may permit the gateway 118 to communicate with wireless access devices such as, for example, the access device 124 and the laptop 117 that may be within the coverage area of the gateway 118. Such wireless access devices may include, for example, audio equipment such as a stereo receiver, speakers, printers, laptop computers, wireless personal digital assistants (PDAs), digital scanners, digital video cameras, mobile multimedia handsets, pointing devices, and the like. The gateway 118 of FIG. 3C is also communicatively coupled to a modem 116 supporting communication via the broadband connection 107. The modem 116 and the broadband connection 107 may correspond, respectively, to the modem 116 and the broadband connection 107 of FIGS. 1 and 2. The gateway 118 of FIG. 3C comprises a processor 151 communicatively coupled to the wireless interface 120, the laptop 117, and the modem 116.

The gateway 118 also comprises multimedia format conversion functionality 152. The multimedia format conversion functionality 152 comprises the software and/or hardware capabilities for the conversion of multimedia information from one of the previously described formats to another. The illustration of FIG. 3C also comprises a set of user-defined quality of service (QoS) criteria 153, accessible to the processor 151, and user-defined quality of service criteria 155, 157 accessible, respectively, to the access device 124 and laptop 117. The user-defined quality of service criteria 155, 157 represent alternate locations in which the set of quality service criteria may reside. The quality of service criteria 155, 157 may be communicated to the gateway 118 by the access device 124 upon entry into the coverage area of the gateway 118, or periodically while the access device 124 and the laptop 117 are being served by the gateway 118. The communication system of FIG. 3C comprises digital rights management functionality 154 that may be used to enforce the rights of authors and/or owners of multimedia information accessed by the access device in communication with the gateway 118. In addition, the communication system of FIG. 3C comprises digital rights management functionality 156, 158 accessible by access device 124 and the laptop 117, respectively. Access rights conveyed by digital rights management functionality 156, 158 may be communicated to a broadband access gateway such as, for example, the gateway 118 upon entering the coverage area of the gateway 118, or periodically while being served by the gateway 118.

As shown in the illustration of FIG. 3C, a representative embodiment of the present invention may support digital rights management (DRM) for multimedia information. Information conveying permissions or authority to consume multimedia content such as, for example, a digital certificate, may be stored within or transferred to a broadband access gateway such as, for example, the gateway 118 or the router 130 of FIG. 2. The presence of such information is represented in FIG. 3C by the digital rights management functionality 154, 156, 158. In a representative embodiment of the present invention, a digital certificate, for example, may be contained within the digital rights management functionality 154, 156, 158, and may be used to regulate access to and the conversion of multimedia information into alternate formats according to privileges granted by the media-rights owner. For instance, a video clip encoded in Windows Media Video (WMV) format that is protected using digital rights management may be accessed and converted to an alternate format using the digital rights management functionality 154 associated with the gateway 118. Digital rights management information represented by a digital certificate or other authorization/authentication means may permit conversion from, for example, the Windows Media Video format described above to another format such as, for example, MPEG-2. The authorization may, for example, permit transmission to an access device not having storage capability. In another representative embodiment of the present invention, the conversion of digital versatile disk (DVD, sometimes referred to as digital video disk)-quality multimedia video to a lower quality video stream by a broadband access gateway, may be enabled by the digital rights management functionality 154. As described above, a user of the access device 124 may not have the right to view streaming video in DVD quality, but may be permitted to view a reduced resolution version. In a representative embodiment of the present invention, the level or quality of a format conversion may be based upon the digital rights management functionality 154 illustrated in FIG. 3C. In a representative embodiment of the present invention, the functions related to the conversion of multimedia information described above may alternatively be performed by network-based servers.

Figure 4:
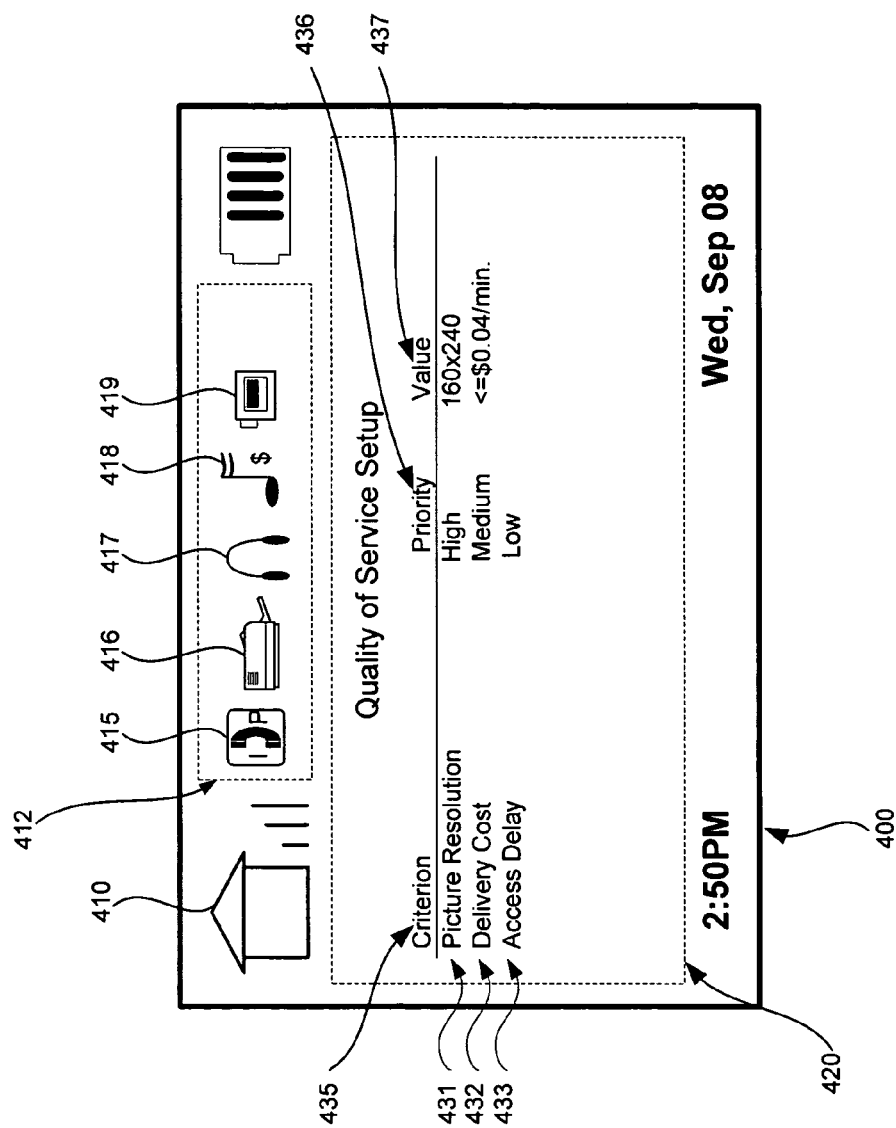
FIG. 4 shows exemplary quality of service setup information within a display area of an access device that may correspond, for example, to the access device or the wireless PDA of FIGS. 1 and 2, in accordance with a representative embodiment of the present invention.

FIG. 4 shows exemplary quality of service setup information within a display area 420 of an access device that may correspond, for example, to the access device 124 or the wireless PDA 119 of FIGS. 1 and 2, in accordance with a representative embodiment of the present invention. The display 400 of FIG. 4 comprises a network indicator 410, a network services indicator area 412, a battery life indicator, a time of day indicator, and a day and date indicator. The display 400 also comprises a display area 420 to allow an access device to present graphical or textual information for a variety of reasons and from a number of sources. The network services indicator area 412 in the example of FIG. 4 shows an Internet protocol (IP) phone service icon 415, a printer service icon 416, a stereo entertainment icon 417, a pay music service icon 418, and a video entertainment icon 419. The display area 420 of FIG. 4 has been arranged in a tabular format comprising a criterion column 435, a priority column 436, and a value column 437. The display area 420 shows three user-defined quality of service criteria entries 431, 432, 433 that indicate the relative importance or priority of three aspects of multimedia consumption that define quality of service for the user of the associated access device. As shown in FIG. 4, the user has indicated in criteria entry 431 that "Picture Resolution" has a priority of "High", and should be at least 160 pixels by 240 pixels. The next criteria entry 432 indicates that the user desires to have "Delivery Cost" to have a medium priority, and that the cost should not be greater than $0.04 per minute of use. For this user, the third criteria entry 433 shows that "Access Delay" is the lowest priority when making adjustments for bandwidth limitation of the delivery path. Although the illustration of FIG. 4 uses a tabular format, and textual indicators of only three user-defined quality of service criteria and associated priorities are shown, many other forms of user interface could be employed without departing from the spirit of the present invention For example, the user may be offered a graphical interface, priority may be indicated by numeric value or size or design of an icon, and priority may be expressed in the form of a comparative or logical relationship between criteria. The illustration of FIG. 4 is meant to act as an aid to the understanding of one possible embodiment of the present invention, and does not represent limitations of the present invention as other user interfaces are contemplated.

In a representative embodiment of the present invention, a set of criteria such as, for example, the criteria of entries 431, 432, 433 shown in FIG. 4 may comprise a set quality of service criteria that may be used in selecting the conversion of multimedia information in an access device. As described above, the selection of a conversion from one multimedia format to another may be based upon one or more of a number of parameters such as, for example, spatial resolution, color depth, number of levels of gray scale, frame rate, number of dropped frames, bits per audio sample, number of samples per second, and number of channels of audio, to name only a few.

Figure 5:
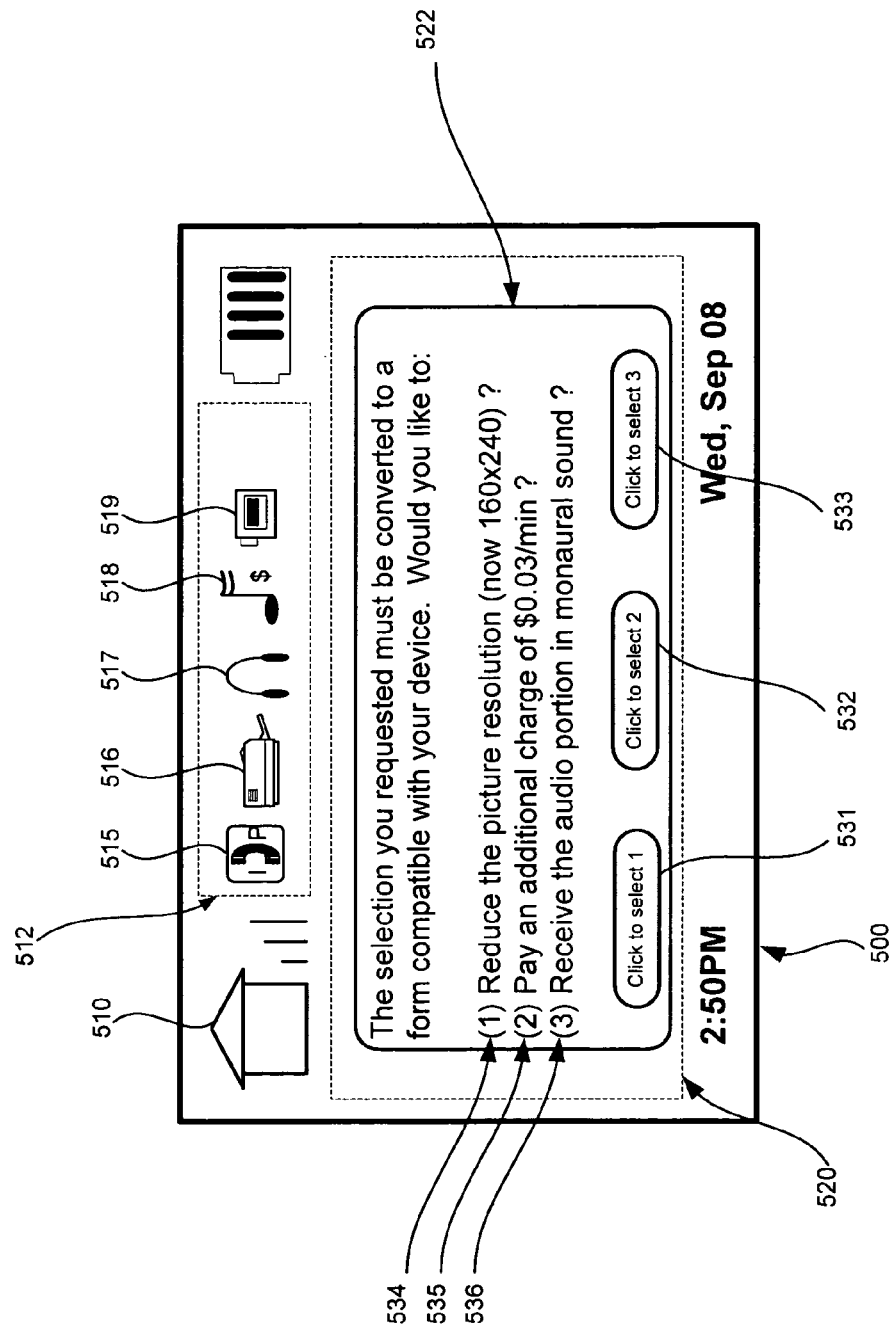
FIG. 5 shows an exemplary pop-up message in the display area of an access device that may correspond, for example, to the access device or the wireless PDA of FIGS. 1 and 2, in accordance with a representative embodiment of the present invention.

FIG. 5 shows an exemplary pop-up message 522 in the display area 520 of an access device that may correspond, for example, to the access device 124 or the wireless PDA 119 of FIGS. 1 and 2, in accordance with a representative embodiment of the present invention. The display 500 of FIG. 5 comprises a network indicator 510, a network services indicator area 512, a battery life indicator, a time of day indicator, and a day and date indicator. The display 500 also comprises a display area 520 to allow an access device to present graphical or textual information for a variety of reasons and from a number of sources. The network services indicator area 512 in the example of FIG. 5 shows an Internet protocol (IP) phone service icon 515, a printer service icon 516, a stereo entertainment icon 517, a pay music service icon 518, and a video entertainment icon 519. The display area 520 of FIG. 5 illustrates a pop-up message 522 notifying the user of the access device that a request for access to, for example, video multimedia information involves the conversion of the requested multimedia information to a format compatible with the access device being used. The pop-up message 522 may be displayed when, as described above, the conversion is determined to result in an impact to the quality of service experienced by the user. As shown in FIG. 5, the pop-up message 522 provides the user with alternatives that permit the user to choose the impact on the user. In the illustration of FIG. 5, the user-defined quality of service criteria may correspond, for example, to the user-defined quality of service criteria shown in FIG. 4. In a representative embodiment of the present invention, a user in such a situation may, as shown in the example of FIG. 5, be offered the option of viewing a lower-resolution version of the requested multimedia item. Such an option is shown in FIG. 5 as item 534. The user of the access device may select item 534 by clicking on button 531. The user may also be offered an opportunity to override one of the pre-defined quality of service criteria by authorizing an increase in the cost of the bandwidth needed for multimedia consumption. Such an option is shown in FIG. 5 as item 535. The user of the access device may select item 535 by clicking on button 532. In the example of FIG. 5, the user is also offered an opportunity to receive accompanying audio content in monaural sound, rather than the stereo (two-channel) version requested. Such an option is shown in FIG. 5 as item 536. The user of the access device may select item 536 by clicking on button 533. Various representative embodiments of the present invention may offer options such as those shown in FIG. 5, to permit a user to temporarily re-define the quality of service criteria when a conversion of multimedia information may allow a user to access forms of multimedia information incompatible with the access device in use. The use of a messaging means such as, for example, the pop-up message 522 is one example of a mechanism by which the user of the access device may be notified. Other methods include, for example, the playing of an audio signal, or playback of a voice message. By presenting the user with an opportunity to select the form of multimedia information, a representative embodiment of the present invention provides flexibility that accommodates the desires of the user.

Figure 6:
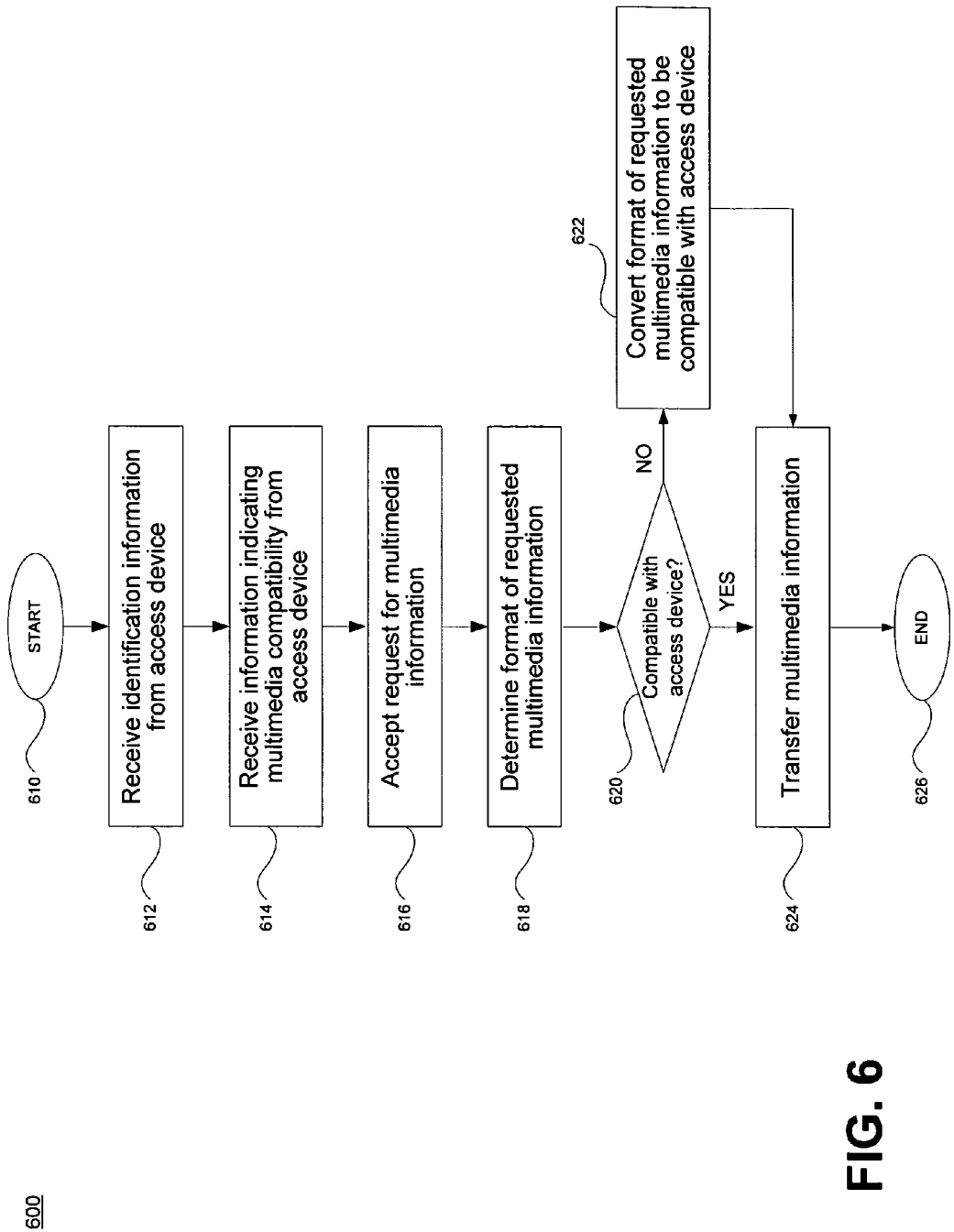
FIG. 6 is a flowchart of an exemplary method of operating a broadband access gateway that may correspond, for example, to the gateway or the router of FIGS. 1 and 2, in which the gateway supports automatic format conversion of multimedia information, in accordance with a representative embodiment of the present invention.

FIG. 6 is a flowchart 600 of an exemplary method of operating a broadband access gateway that may correspond, for example, to the gateway 118 or the router 130 of FIGS. 1 and 2, in which the gateway supports automatic format conversion of multimedia information, in accordance with a representative embodiment of the present invention. The method of FIG. 6 begins (block 610) when a broadband access gateway such as, for example, the gateway 118 or router 130 of FIGS. 1 and 2 is powered up. At some later point in time, the gateway may receive, from an access device, information identifying the access device and/or the user of the access device (block 612). Information identifying an access device may include, for example, an electronic serial number, an Internet protocol (IP) address, a media access control (MAC) address, information identifying a make of an access device, and information identifying a model of an access device. Information identifying the user of an access device may comprise, for example, a member identifier, a user name, an administrative identifier, and a credit card number. The identification information may, for example, be provided by an access device upon entry into a coverage area of a gateway, or periodically when in communication with a gateway. At the time that information identifying the access device is received, or at a later time, the gateway 118 may receive information indicating the multimedia compatibility of the access device 118 (block 614). In a representative embodiment of the present invention, such information may alternately be resident within the gateway 118, and may be access using the received identifying information.

Later, the gateway 118 may receive a request for multimedia information such as, for example, a video or audio clip (block 616). As described above, the requested multimedia information may be encoded for transmission via a pathway having at least a predefined amount of bandwidth available, for an access device having a certain minimum set of capabilities, or according to any of a number of other parameters or criteria. The broadband access gateway may then determine the format of the requested multimedia information (block 618). In various embodiments of the present invention, the format of the requested multimedia information may be determined from the information that identifies the requested multimedia information such as, for example, a filename or extension, or from meta-information received from the source of the multimedia information or the multimedia information as it is received. A check is then made to determined whether the format of the multimedia information requested is compatible with the access device being used by the user (block 620). As previously described, user-defined quality of service criteria may be used in determining whether the requested multimedia information can be converted to a format compatible with the access device in use, without violating the user-defined quality of service criteria.

If the requested multimedia information is compatible with the access device in use, the requested multimedia information may be transferred to the access device for consumption (block 624), and the method is complete (block 626). If, however, the requested multimedia information is not compatible with the access device in use, the broadband access gateway 118 may convert the format of the requested multimedia information to a format that the access device is capable of handling (block 622). The broadband access gateway 118 may employ the user-defined quality of service criteria discussed above in selecting the format to be used. The conversion may involve not only a change in the coding of the multimedia information, but also changes in other factor such as, bit rate, color depth, spatial resolution, bits per sample, samples per second, and the like, as discussed above. The converted version of the requested multimedia information may then be transferred to the access device (block 624), and the method is completed (block 626).

Figure 7:
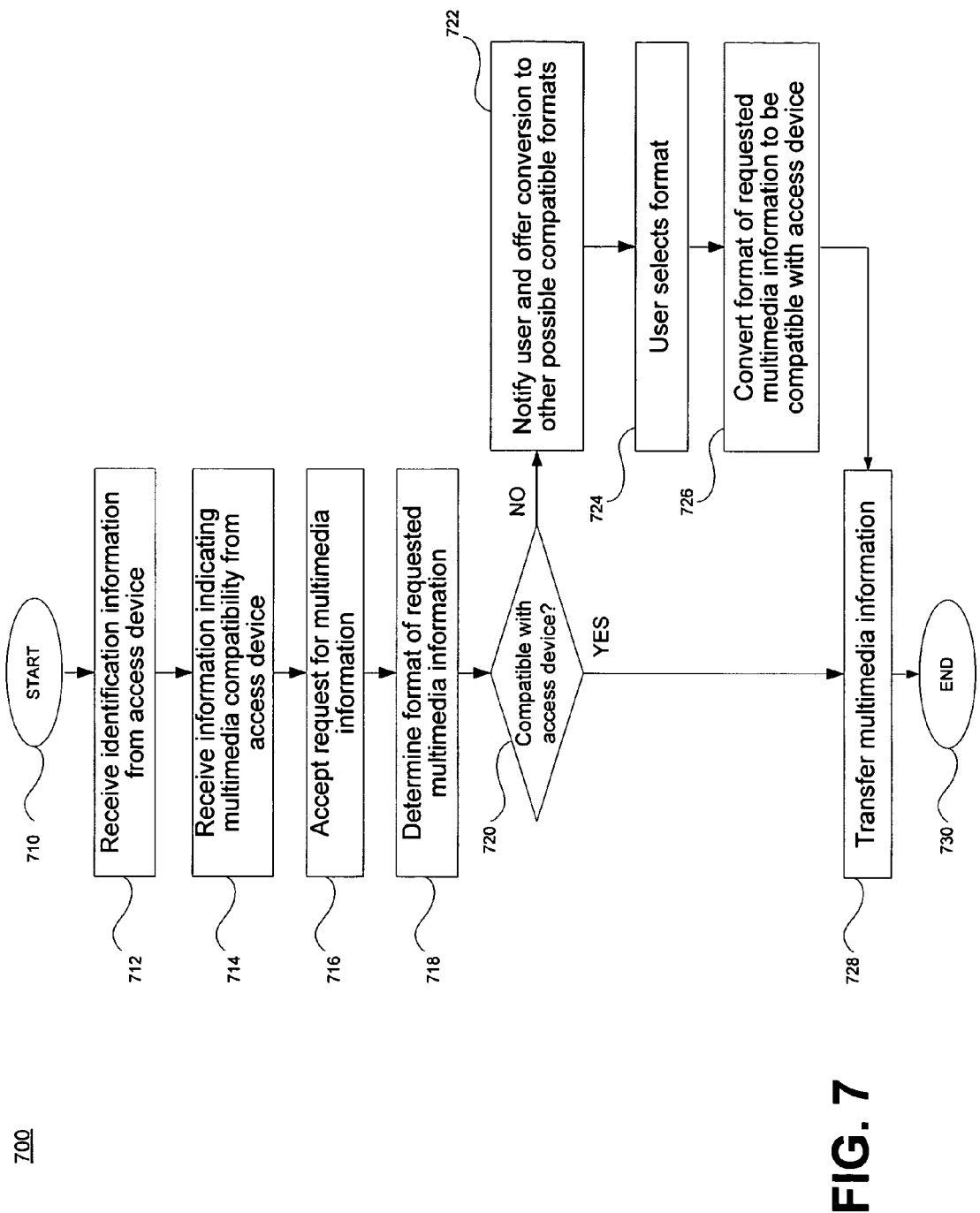
FIG. 7 is a flowchart of an exemplary method of operating a broadband access gateway that may correspond, for example, to the gateway or the router of FIGS. I and 2, in which the gateway supports automatic format conversion of multimedia information and notification of a user, in accordance with a representative embodiment of the present invention.

FIG. 7 is a flowchart 700 of an exemplary method of operating a broadband access gateway that may correspond, for example, to the gateway 118 or the router 130 of FIGS. 1 and 2, in which the gateway supports automatic format conversion of multimedia information and notification of a user, in accordance with a representative embodiment of the present invention. The method of FIG. 7 begins (block 710) when a broadband access gateway such as, for example, the gateway 118 or router 130 of FIGS. 1 and 2 is powered up. At some later point in time, the gateway may receive, from an access device, information identifying the access device and/or the user of the access device (block 712). Information identifying an access device may include, for example, an electronic serial number, an Internet protocol (IP) address, a media access control (MAC) address, information identifying a make of an access device, and information identifying a model of an access device. Information identifying the user of an access device may comprise, for example, a member identifier, a user name, an administrative identifier, and a credit card number. The identification information may, for example, be provided by an access device upon entry into a coverage area of a gateway, or periodically when in communication with a gateway. At the time that information identifying the access device is received, or at a later time, the gateway 118 may receive information indicating the multimedia compatibility of the access device 118 (block 714). In a representative embodiment of the present invention, such information may alternately be resident within the gateway 118, and may be access using the received identifying information.

Later, the gateway 118 may receive a request for multimedia information such as, for example, a video or audio clip (block 716). As described above, the requested multimedia information may be encoded for transmission via a pathway having at least a predefined amount of bandwidth available, for an access device having a certain minimum set of capabilities, or according to any of a number of other parameters or criteria. The broadband access gateway may then determine the format of the requested multimedia information (block 718). In various embodiments of the present invention, the format of the requested multimedia information may be determined from the information that identifies the requested multimedia information such as, for example, a filename or extension, or from information received from the source of the multimedia information or the multimedia information as it is received. A check is then made to determined whether the format of the multimedia information requested is compatible with the access device being used by the user (block 720). As previously described, user-defined quality of service criteria may be used in determining whether the requested multimedia information can be converted to a format compatible with the access device in use, without violating the user-defined quality of service criteria.

If the requested multimedia information is compatible with the access device in use, the requested multimedia information may be transferred to the access device for consumption (block 728), and the method is complete (block 730). If, however, the requested multimedia information is not compatible with the access device in use, the broadband access gateway 118 may notify the user of the access device, and offer conversion to one or more alternate formats (block 722). The broadband access gateway 118 may employ the user-defined quality of service criteria discussed above in offering alternate formats to be the user. Using the information presented, the user of the access device may then select a format (block 724), and the requested multimedia information may be converted to the selected format (block 726). The conversion may involve not only a change in the coding of the multimedia information, but also changes in other factor such as, bit rate, color depth, spatial resolution, bits per sample, samples per second, and the like, as discussed above. The conversion may also be based upon any digital rights management controls that may be associated with the requested multimedia information, as discussed above. The converted version of the requested multimedia information may then be transferred to the access device (block 728), and the method is completed (block 730).

Although the methods illustrated in FIGS. 6 and 7 are shown as being performed as a single pass or event, a representative embodiment of the present invention may loop, to repeat the check of conditions affecting access to the requested multimedia information, to insure that the desired quality of service is met. As discussed above, movement of an access device may change its location sufficiently to cause a change in the communication pathway used for access to multimedia information. As changes in the communications pathway occur, increase and decreases in the available network capacity may occur, impacting the ability of the network to deliver the desired level of service. By repeatedly evaluating whether the quality of service desired by the consumer can be met and adjusting system behavior, a broadband access gateway in accordance with a representative embodiment of the present invention maximizes the quality of service experienced by the user.

Aspects of the present invention may be found in a system supporting access to multimedia information by a plurality of access devices, where the system is capable of automatically converting a format of the multimedia information. Such a system may comprise a gateway communicatively coupled to a broadband network and at least one wireless interface. In a representative embodiment of the present invention, the gateway may be capable of selectively exchanging multimedia information among the at least one wireless interface and the broadband network, and of communicating with the plurality of access devices via the at least one wireless interface. The gateway may also be capable of receiving from at least one of the plurality of access devices, at least one of: information identifying an access device and information identifying a user. In addition, the gateway may be capable of accessing format compatibility information based upon the at least one of information identifying an access device and information identifying a user, and of accepting a request for delivery of identified multimedia information having a first format. The requested multimedia information may be converted from the first format to a second format based upon the format compatibility information.

In various representative embodiments in accordance with the present invention, multimedia information may comprise at least one of: streaming video, broadcast video, voice, digital data, text, digitized audio, digitized still images, digitized video, and digitized music. The format compatibility information may comprise information identifying at least one of: a codec, a bit rate, a spatial resolution, a color depth, a measure of gray scale levels, a frame rate, a number of bits per sample, and a number of samples per unit time. The at least one wireless interface may be compliant with the Bluetooth V1.2 or compatible personal area network (PAN) specification, and may communicate using an unlicensed frequency band. The at least one wireless interface may communicate at a frequency of approximately 2.4 gigahertz, and may be compliant with at least one of: the Institute of Electrical and Electronics Engineers (IEEE) 802.11a, 802.11b, 802.11g, and 802.11n standards. In a representative embodiment of the present invention, the broadband network may comprise at least one of: a digital subscriber line (DSL) network, a cable network, a satellite network, a cellular network, and the Internet. The cellular network may comprise at least one of: a global system for mobile communications (GSM) network, a time division multiple access (TDMA) network, a code division multiple access (CDMA) network, and a universal mobile telecommunications system (UMTS) network.

In various representative embodiments in accordance with the present invention, the information identifying a user may comprise at least one of: a member identifier, a user name, an administrative identifier, and a credit card number. The information identifying an access device may comprise at least one of: an electronic serial number, an Internet protocol (IP) address, a media access control (MAC) address, information identifying a make of an access device, and information identifying a model of an access device. The plurality of access devices may comprise at least one of: a mobile multimedia handset, a personal digital assistant (PDA), a personal computer (PC), a digital scanner, a digital camera, a printer, headphones, and a pointing device. In a representative embodiment of the present invention, the gateway may be capable of delivering the requested multimedia information in the second format to the at least one of the plurality of access devices. In addition, the gateway may be capable of notifying the at least one of the plurality of access devices of at least one of format incompatibility and format conversion options based upon the format compatibility information. The format compatibility information may be sent to the gateway by the at least one of the plurality of access devices In one representative embodiment of the present invention, the conversion of multimedia information from the first format to the second format may be performed by the gateway. In another representative embodiment of the present invention, the conversion of multimedia information from the first format to the second format may be performed by a server accessible via the broadband network.

Further aspects of the present invention may be seen in a method supporting automatic conversion of multimedia information from a first format to a second format. Such a method may comprise receiving from at least one of a plurality of access devices, at least one of: information identifying an access device and information identifying a user. The method may comprise accessing format compatibility information based upon the at least one of: information identifying an access device and information identifying a user, and accepting a request for delivery of identified multimedia information having a first format. The method may comprise converting the requested multimedia information from the first format to a second format based upon the format compatibility information.

A representative embodiment of the present invention may also comprise exchanging multimedia information among at least one wireless interface and a broadband network, where the at least one wireless interface may be compliant with the Bluetooth V1.2 or compatible personal area network (PAN) specification. The at least one wireless interface may communicate using an unlicensed frequency band, may communicate at a frequency of approximately 2.4 gigahertz, and may be compliant with at least one of the Institute of Electrical and Electronics Engineers (IEEE) 802.11a, 802.11b, 802.11g, and 802.11n standards. In various representative embodiments of the present invention, the broadband network may comprise at least one of: a digital subscriber line (DSL) network, a cable network, a satellite network, a cellular network, and the Internet. The cellular network may comprise at least one of: a global system for mobile communications (GSM) network, a time division multiple access (TDMA) network, a code division multiple access (CDMA) network, and a universal mobile telecommunications system (UMTS) network.

In various representative embodiments in accordance with the present invention, multimedia information may comprise at least one of: streaming video, broadcast video, voice, digital data, text, digitized audio, digitized still images, digitized video, and digitized music. The format compatibility information may comprise information identifying at least one of: a codec, a bit rate, a spatial resolution, a color depth, a measure of gray scale levels, a frame rate, a number of bits per sample, and a number of samples per unit time. The information identifying a user may comprise at least one of: a member identifier, a user name, an administrative identifier, and a credit card number. The information identifying an access device may comprise at least one of: an electronic serial number, an Internet protocol (IP) address, a media access control (MAC) address, information identifying a make of an access device, and information identifying a model of an access device. In addition, the plurality of access devices in a representative embodiment of the present invention may comprise at least one of: a mobile multimedia handset, a personal digital assistant (PDA), a personal computer (PC), a digital scanner, a digital camera, a printer, headphones, and a pointing device.

In various representative embodiments according to the present invention, the method may comprise delivering the requested multimedia information in the second format to the at least one of the plurality of access devices, and notifying the at least one of the plurality of access devices of at least one of format incompatibility and format conversion options based upon the format compatibility information. The format compatibility information may be sent by the at least one of the plurality of access devices. Converting the requested multimedia information from the first format to the second format may be performed in a broadband access gateway, and may be performed in a network server.

Yet other aspects of the present invention may be observed in a machine-readable storage, having stored thereon a computer program having a plurality of code sections executable by a machine, for causing the machine to perform the operations of the method described above.

In a representative embodiment of the present invention, the wireless local area networks may include data networks such as, for example, Institute of Electrical and Electronics Engineer (IEEE) 802.11a/b/g/n compliant wireless networks such as those located in homes, hot spots or an office. Such local area networks may operate in unlicensed radio frequency spectrum such as in, for example, the 2.4 and 5 gigahertz regions. Examples of wide area networks may include cellular digital packet data (CDPD), voice and data networks such as public switched telephone networks (PSTN), Global System For Mobile Communication (GSM), GSM General Packet Radio Service (GPRS), GSM Short Message Service (SMS), GSM Enhanced Data Rates For Global Evolution (EDGE), North American Time Division Multiplex Access (TDMA), iDEN, Code Division Multiple Access (CDMA) and CDMA2000 1×RT, Universal Mobile Telecommunications System (UMTS) network, to name only a few.

A personal area network (PAN) may be formed by a plurality of wireless communication access devices such as, for example, mobile multimedia handsets, PDAs, telephones, and computers. Other elements of such a network may, for example, include computer peripherals such as digital scanners, digital cameras, printers, headphones, and pointing devices, that may be located within the immediate proximity of a person. A PAN may be an ad-hoc network of such communication devices. In a representative embodiment of the present invention, access devices within the PAN may communicate with other access devices within the PAN and also with other access devices that are located in other networks accessible via the PAN. The personal area networks may include data networks such as, for example, a Bluetooth compliant network, and Institute of Electrical and Electronics Engineer (IEEE) 802.15.3a compliant wireless networks. Such personal area networks may operate in unlicensed radio frequency spectrum such as, for example, the 2.4 and 5 gigahertz regions. Details of one example of a personal area network are provided in the document "Bluetooth Core Specification V1.2", Nov. 5, 2003, from Bluetooth SIG, Inc., the complete subject matter of which is hereby incorporated herein by reference, in its entirety. For example, in a Bluetooth® wireless PAN, a first Bluetooth®-enabled wireless access device may communicate with a second Bluetooth®-enabled wireless access device within the PAN. Additionally, either of the first and second Bluetooth®-enabled wireless access devices may communicate with the Internet or another LAN or WAN via the Bluetooth® wireless PAN.

In a representative embodiment of the present invention, a gateway may be adapted to provide seamless and transparent communication between a plurality of access devices and a plurality of networks. The functionality of the gateway may be divided, for example, into application content functionality, and configuration and management functionality. The application content functionality may, for example, deal with the types of applications that may be supported by the gateway as well as the various types of data that may be received, processed and/or transmitted by the gateway. In this regard, application content functionality may also include the manner in which other devices and/or systems may utilize data from the gateway.

Content and application services are important because all the information coming into and leaving the home from either the WAN side (i.e., the broadband connection side), or from the PAN side (i.e., the access device side) converges at the gateway. The PAN side may comprise Bluetooth, wireless LAN (IEEE 802.11 a/b/g/n), IEEE 802.15.3a ultra-wideband, or cellular, for example. Notwithstanding, the gateway may be adapted to convert, for example, wirelessly received GSM-formatted information into, for example, Internet protocol (IP)-formatted information and in reverse, converts IP-formatted information into wireless GSM-formatted information suitable for over-the-air transmission. Support for other wireless communication protocols such as TDMA, CDMA, and UMTS may also be provided. In a representative embodiment of the present invention, the gateway may comprise suitable circuitry, logic and/or code that may be adapted to receive and process MPEG related data, which may be suitable for display on a screen. The gateway in an embodiment of the present invention functions as a focal point where data converges from a plurality of wired and wireless services. Although, in a particular embodiment of the present invention the gateway may do very little in terms of actual content aggregation, there is virtual aggregation of data. The converged data may be integrated and or otherwise utilized to offer unique opportunities for launching various content and application services from a single strategic location. Since the gateway in an embodiment of the present invention is the focal point where data converges, one or more protocol stacks may be employed for launching the various content and application services.

The gateway in a representative embodiment of the present invention may be adapted to route calls based on established rules that may be programmed into the gateway. For example, the gateway may be governed by a rule which states that local calls are to be routed to an incumbent local exchange carrier (iLEC), while long distance calls are to be handled by Long Distance Carrier Company. Accordingly, when a call originates at the gateway and it is determined that the call is a local call, the gateway may be adapted to route the call to the iLEC. However, if the gateway determines that the call is a long distance call, then the gateway may be adapted to route the call to Long Distance Carrier Company.

A representative embodiment of the present invention may leverage existing broadband infrastructure that is commonly found in many homes and businesses today. Because a consumer is already paying for the use of the broadband infrastructure in their home or office, leveraging the use of the existing broadband infrastructure for communication with wide area networks results in minimal or no communication costs. The broadband infrastructure may be, for example, a cable or DSL infrastructure.

The wireless interface function provided by the gateway located within a home, for example, may be utilized to route or communicate a great deal of traffic to a wired network such as a broadband network or a wireless network such as a GSM or CDMA network via a broadband connection. In other words, the wireless gateway infrastructure provided by a representative embodiment of the present invention provides a scalable network infrastructure that rides on an existing access infrastructure already supplied by a broadband service provider to a home, office or business. Additionally, the scalable infrastructure provided by the gateway also solves the problems associated with signal penetration and propagation, thereby providing improved quality of service (QoS). From a market perspective, a wireless service provider may now have access to the necessary infrastructure to provide improved wireless services to users within a home or office. Accordingly, in order to rapidly increase their growth, wireless service providers may now target that portion of the in-home landline or plain old telephone system (POTS) business, which have traditionally been handled by incumbent local exchange carriers (ILECs) or other LECs.

The unlicensed mobile access gateway described above may possess a significant amount of processing power. The gateways of existing systems fall short of realizing the full potential of the merged wired and wireless communication network that is enabled by a representative embodiment of the present invention. Numerous basic and enhanced communication services may be enabled or provided by the gateway. Support for access devices such as, for example, mobile multimedia handsets and PDAs may be involved in order to utilize these basic and enhanced communication services enabled by the new wave of digital technologies. Current and/or proposed mobile access gateway systems, however, do not provide the range of support needed for their use by the everyday consumer.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
    a wireless communication interface to communicate with wireless devices including an access device in a coverage area;
    a modem to communicate data with a broadband network; and
    a gateway in data communication with the wireless communication interface and the modem, the gateway being operable to receive information identifying multimedia formats that the access device is able to process and further being operable to receive quality of service criteria specified for use by the access device to maintain a specified level of quality of consumption of multimedia information by the access device, the gateway further being operable to receive from the access device a request for delivery of data defining an audio or a video clip to the access device, the gateway further operable to compare the information identifying multimedia formats that the access device is able to process with information about format of the requested data defining an audio or video clip and to automatically convert the data defining the audio or a video clip to a multimedia format that the access device is able to process in satisfaction of the received quality of service criteria specified for the access device.

2. The system of claim 1 wherein the gateway is further operable to communicate data to the wireless communication interface to inform a user of the access device when conversion of the requested data defining the audio or the video clip is necessary.

3. The system of claim 2 wherein the gateway is further operable to communicate data to the wireless communication interface to inform the user of the access device when conversion is likely to impact quality of consumption of the audio or video clip.

4. The system of claim 1 wherein the gateway is further operable to communicate data to the wireless communication interface to inform a user of the access device when conversion of the requested data defining the audio or the video clip is necessary and to prompt the user of the access device to select conversion of the requested data.

5. The system of claim 4 wherein the gateway is further operable to communicate data to the wireless communication interface to prompt the user to select conversion of the requested data to one format of a plurality of format conversion options.

6. The system of claim 5 wherein the gateway is further operable to communicate data to the wireless communication interface to prompt the user with observable impairments of the audio or video clip associated with respective options of the plurality of format conversion options.

7. The system of claim 1 wherein the gateway is further operable to communicate through the wireless communication interface to the access device data defining a user interface for selection by a user of the access device of one or more quality of service criteria for consumption of multimedia information including the audio or video clip.

8. The system of claim 1 wherein the gateway is further operable to selectively communicate multimedia information including the data defining an audio or a video clip between the wireless communication interface and the modem and of communicating with the wireless devices including the access device in the coverage area via the wireless communication interface.

9. The system of claim 1 wherein the gateway is further operable to receive from the access device identification information which identifies the access device or information identifying a user of the access device, or both, and wherein the gateway is operable to access information identifying multimedia formats that the access device is able to process using the identification information.

10. A method comprising:
    at a gateway, communicating data between a wireless communication interface which serves wireless devices in a coverage area and a modem which is in data communication with a broadband network;
    at the gateway, receiving from an access device communicating in the coverage area with the wireless device, a request for an audio clip or a video clip;
    determining format information for the requested audio clip or video clip;
    determining audio or video processing capabilities of the access device;
    comparing the format information for the requested audio clip or video clip with the audio or video processing capabilities of the access device;
    if the access device cannot process the requested audio clip or video clip, determining quality of service criteria specified for the access device or a user of the access device, the quality of service criteria indicating relative importance or priority of aspects of multimedia consumption for the access device or the user of the access device; and retrieving data defining the requested audio clip or video clip and converting the retrieved data to a format which can be processed by the access device, the conversion being made in accordance with the specified quality of service criteria.

11. The method of claim 10 further comprising:
informing the user of the access device when conversion of the retrieved data is necessary.

12. The method of claim 10 further comprising:
informing the user of the access device when conversion is likely to impact quality of consumption of the audio or video clip.

13. The method of claim 10 further comprising:
informing the user of the access device when conversion of the retrieved data defining the requested audio clip or video clip is necessary to conform to the access device and prompting the user of the access device to approve conversion of the requested data.

14. The method of claim 13 further comprising:
prompting the user to select conversion of the requested data to one format of a plurality of format conversion options.

15. The method of claim 10 wherein determining quality of service criteria specified for the access device or a user of the access device comprises:
receiving from the user of the access device data defining quality of service preferences of the user.

16. The method of claim 15 wherein receiving data defining the quality of service preferences of the user comprises receiving information about user preferences for at least one of spatial resolution, color depth, frame rate, frequency of dropped frames, number of pixels in each frame of video displayed, number of bits per pixel, number of frames displayed each second, method of video encoding used, and acceptable delivery delay for video data including the video clip.

17. The method of claim 15 wherein receiving data defining the quality of service preferences of the user comprises receiving information about user preferences for at least one of distortion in an audio signal, real-time audio playback, required bandwidth, number of audio samples per second of playback, number of bits per sample, number of channels of audio, type of coding used, and communications protocols used to transport audio data including the audio clip.

18. A method comprising:
at a gateway, initiating data communication with a wireless communication interface and a broadband modem, the wireless communication interface configured for communication with wireless devices in a coverage area of the wireless communication device and the broadband modem configured for communication with a broadband network, the gateway being operable to communicate data between the broadband modem and the wireless communication interface;
at the gateway, initiating communication with an access device in the coverage area of the wireless communication interface;
communicating data to the access device to prompt a user of the access device to specify a set of quality of service criteria for use in selecting conversion of multimedia information in the access device, the quality of service criteria indicating relative importance or priority of aspects of consumption of audio or video information for the access device or the user of the access device;
receiving and storing the user-specified quality of service criteria;
receiving from the access device a request for an audio clip or a video clip;
determining format information for the requested audio clip or video clip;
determining audio or video processing capabilities of the access device;
comparing the format information for the requested audio clip or video clip with the audio or video processing capabilities of the access device;
if the access device cannot process the requested audio clip or video clip, using the user-specified quality of service criteria, converting the data for the audio clip or the video clip to a format which can be processed by the access device.

19. The method of claim 18 further comprising:
informing the user of the access device when conversion of the retrieved data is necessary.

20. The method of claim 18 further comprising:
informing the user of the access device when conversion is likely to impact quality of consumption of the audio or video clip.

* * * * *